United States Patent
Kelly

(10) Patent No.: US 10,619,967 B2
(45) Date of Patent: Apr. 14, 2020

(54) ENERGY ABSORBER AND METHOD FOR SHOOTING EQUIPMENT

(71) Applicant: Daniel N. Kelly, Littleton, CO (US)

(72) Inventor: Daniel N. Kelly, Littleton, CO (US)

(*) Notice: Subject to any disclaimer, the term of this patent is extended or adjusted under 35 U.S.C. 154(b) by 0 days.

(21) Appl. No.: 16/260,855

(22) Filed: Jan. 29, 2019

(65) Prior Publication Data
US 2019/0234702 A1 Aug. 1, 2019

Related U.S. Application Data

(60) Provisional application No. 62/623,618, filed on Jan. 30, 2018.

(51) Int. Cl.
| | |
|---|---|
| *F41B 5/20* | (2006.01) |
| *F41B 5/14* | (2006.01) |
| *F16F 7/10* | (2006.01) |
| *F41C 27/22* | (2006.01) |

(52) U.S. Cl.
CPC .............. *F41B 5/1426* (2013.01); *F16F 7/10* (2013.01); *F41C 27/22* (2013.01)

(58) Field of Classification Search
CPC ........................................ F41B 5/1426
USPC ................................ 124/86, 88, 89
See application file for complete search history.

(56) References Cited

U.S. PATENT DOCUMENTS

| | | | | |
|---|---|---|---|---|
| 3,658,157 A | * | 4/1972 | Lee ................. | F41B 5/1426 188/378 |
| 4,834,061 A | * | 5/1989 | Chattin .............. | F41B 5/1426 124/86 |
| 5,531,211 A | * | 7/1996 | Wilfong, Jr. ........... | F41B 5/14 124/25.6 |
| 5,937,843 A | * | 8/1999 | Troncoso ............ | F41B 5/1426 124/89 |
| 6,290,217 B1 | * | 9/2001 | Schneider ............ | F16F 7/14 188/378 |
| 6,298,842 B1 | * | 10/2001 | Sims .................. | F41B 5/1426 124/89 |
| 6,532,945 B1 | * | 3/2003 | Chattin .............. | F41B 5/10 124/25.6 |
| 6,681,755 B2 | * | 1/2004 | Pujos ................. | F41B 5/1426 124/89 |
| 6,745,757 B2 | * | 6/2004 | Sims ................. | F41B 5/1426 124/89 |
| 6,802,307 B2 | * | 10/2004 | Leven ............... | F41B 5/1426 124/89 |
| 7,213,590 B2 | * | 5/2007 | Pellerite ............ | F41B 5/1426 124/89 |
| 7,303,185 B2 | * | 12/2007 | Sebert ............... | F16F 7/14 248/560 |
| 7,703,449 B2 | * | 4/2010 | Wright .............. | F41B 5/1426 124/89 |

(Continued)

*Primary Examiner* — Alexander R Niconovich
(74) *Attorney, Agent, or Firm* — Barclay Damon LLP

(57) ABSTRACT

An energy absorber and method are described herein. The energy absorber, in an embodiment, includes a shooting equipment coupler, a base, a support, a plurality of cord segments that couple the base to the support, and an object coupled to the support. The base, support and cord segments are configured so that the cord segments have an initial shape before an aiming force is received, change to an aim response shape after the aiming force is received, and change to a shot response shape after a shot force occurs.

20 Claims, 37 Drawing Sheets

(56) References Cited

U.S. PATENT DOCUMENTS

| | | | | |
|---|---|---|---|---|
| 8,695,580 B2* | 4/2014 | LoRocco | .............. | F41B 5/1426 |
| | | | | 124/89 |
| 8,931,470 B1* | 1/2015 | Khoshnood | ........... | F41B 5/1426 |
| | | | | 124/89 |
| 9,016,268 B2* | 4/2015 | Leven | ................... | F41B 5/1426 |
| | | | | 124/89 |
| 9,163,896 B2* | 10/2015 | Jacobs | ................. | F41B 5/1426 |
| 2007/0151553 A1* | 7/2007 | Leven | ................... | F41B 5/1426 |
| | | | | 124/89 |
| 2010/0095943 A1* | 4/2010 | Cooper | ................ | F41B 5/1426 |
| | | | | 124/89 |
| 2010/0192932 A1* | 8/2010 | Brewster | ............... | F41B 5/1407 |
| | | | | 124/89 |
| 2012/0204851 A1* | 8/2012 | McPherson | ............... | F41B 5/10 |
| | | | | 124/25.6 |
| 2013/0118468 A1* | 5/2013 | Kozlik | ................. | F41B 5/1426 |
| | | | | 124/89 |
| 2016/0123422 A1* | 5/2016 | Keinanen | ................ | F16F 7/116 |
| | | | | 188/380 |
| 2016/0290759 A1* | 10/2016 | McPherson | ............. | F41C 23/06 |

\* cited by examiner

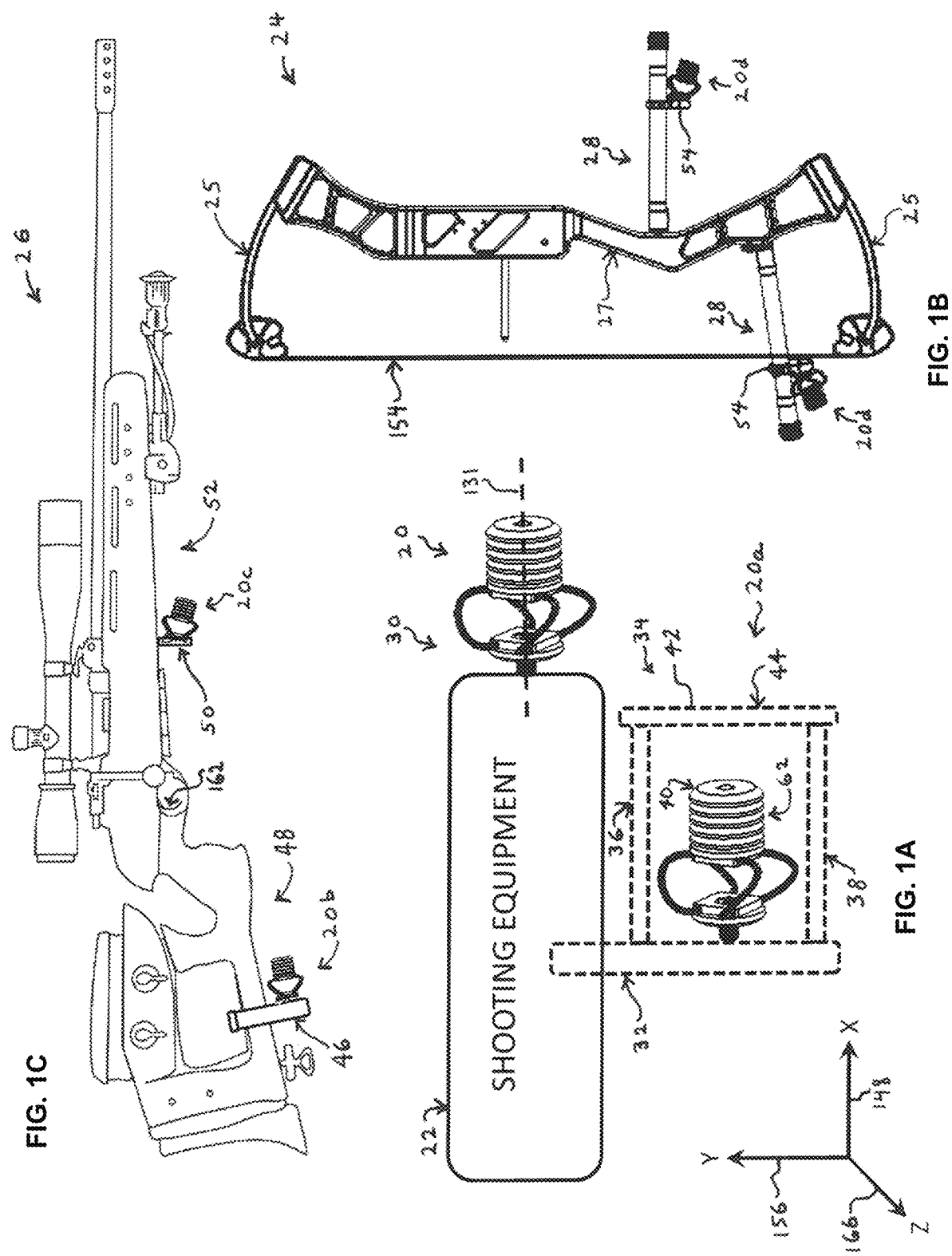

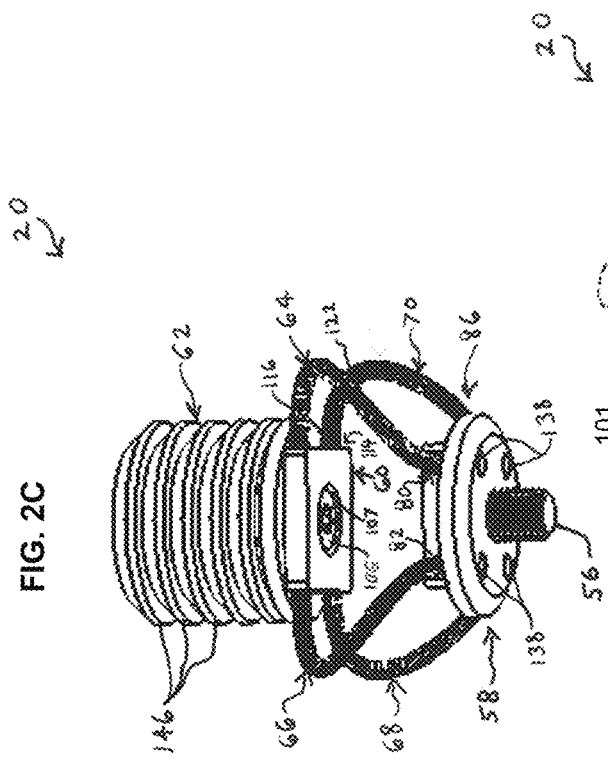
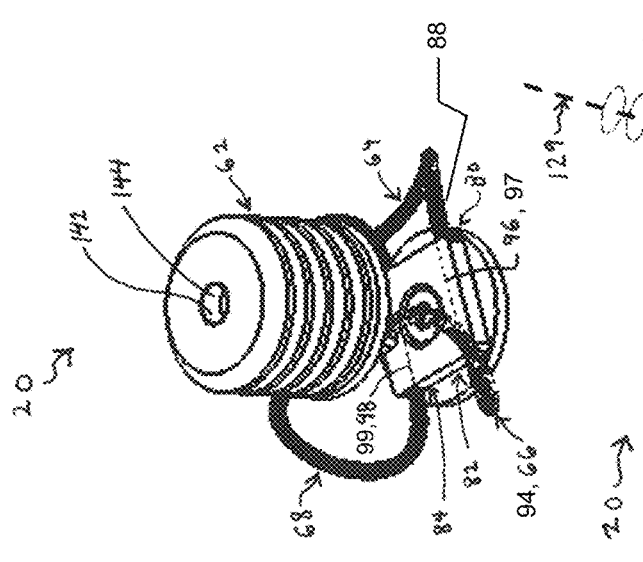
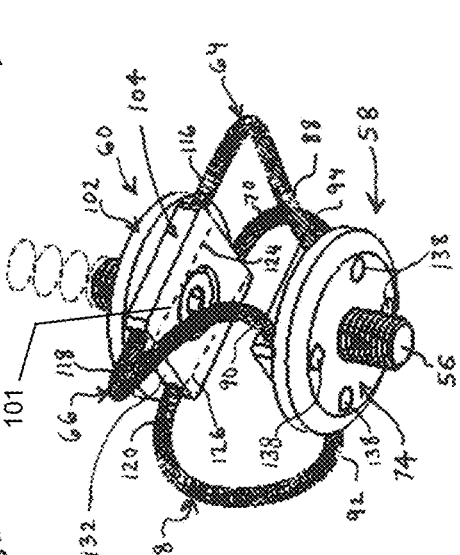
FIG. 2C
FIG. 2D
FIG. 2B
FIG. 2A

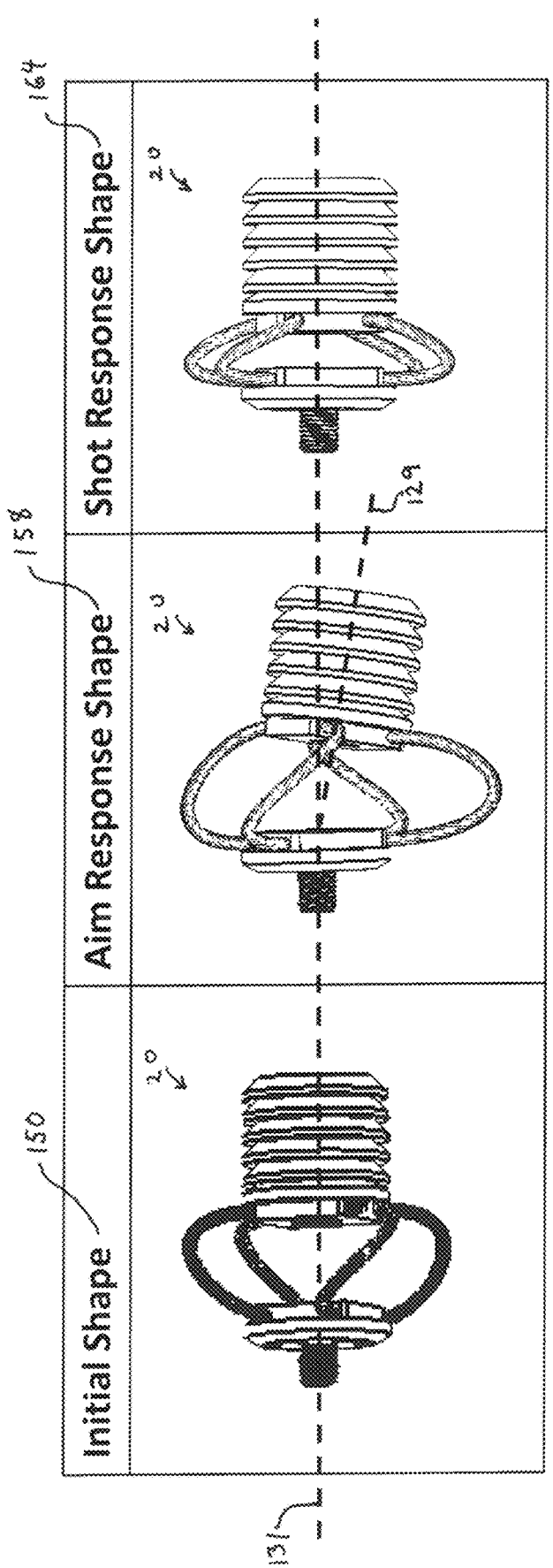
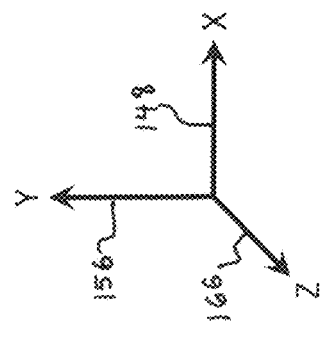
FIG. 3

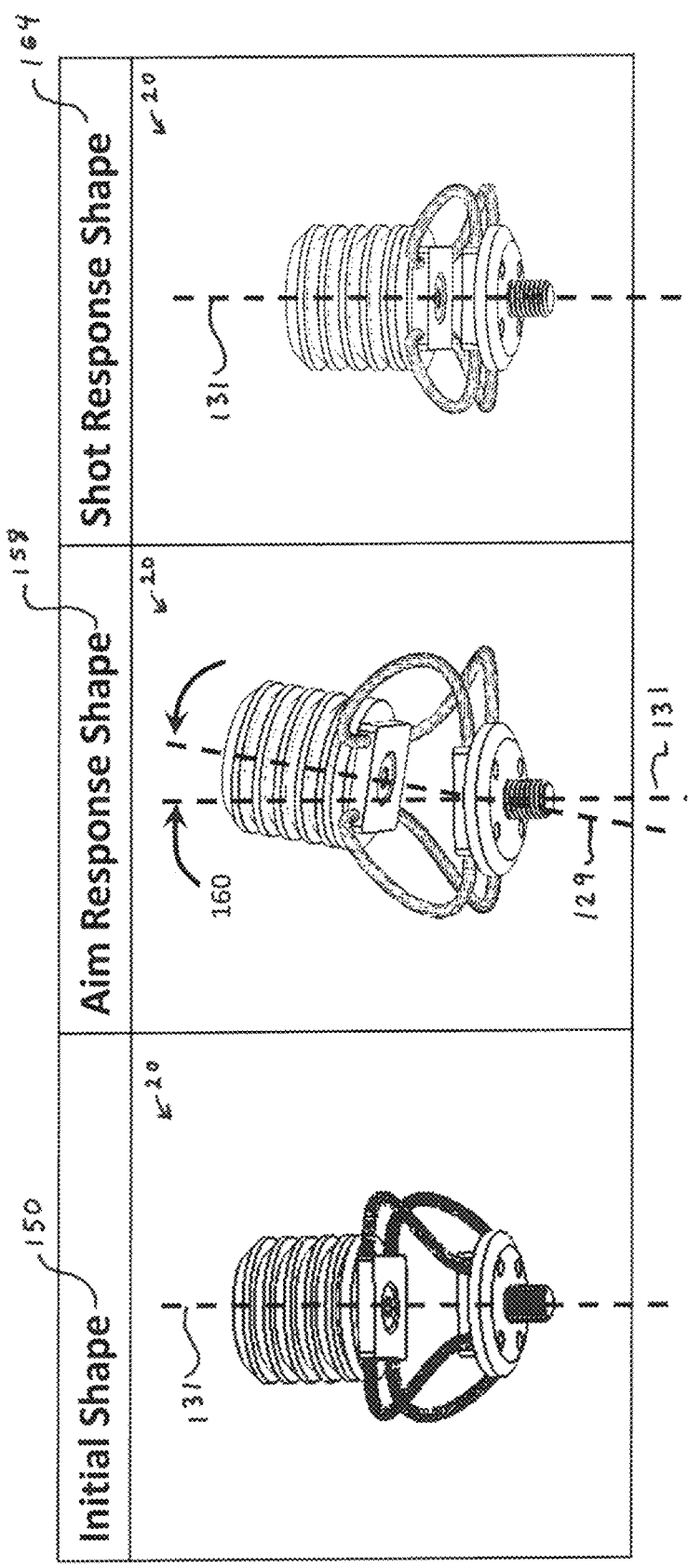
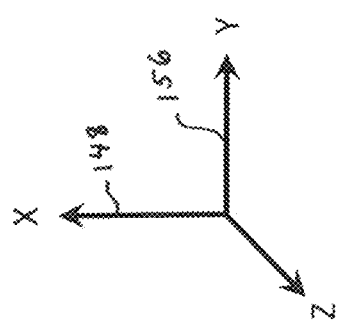
FIG. 7

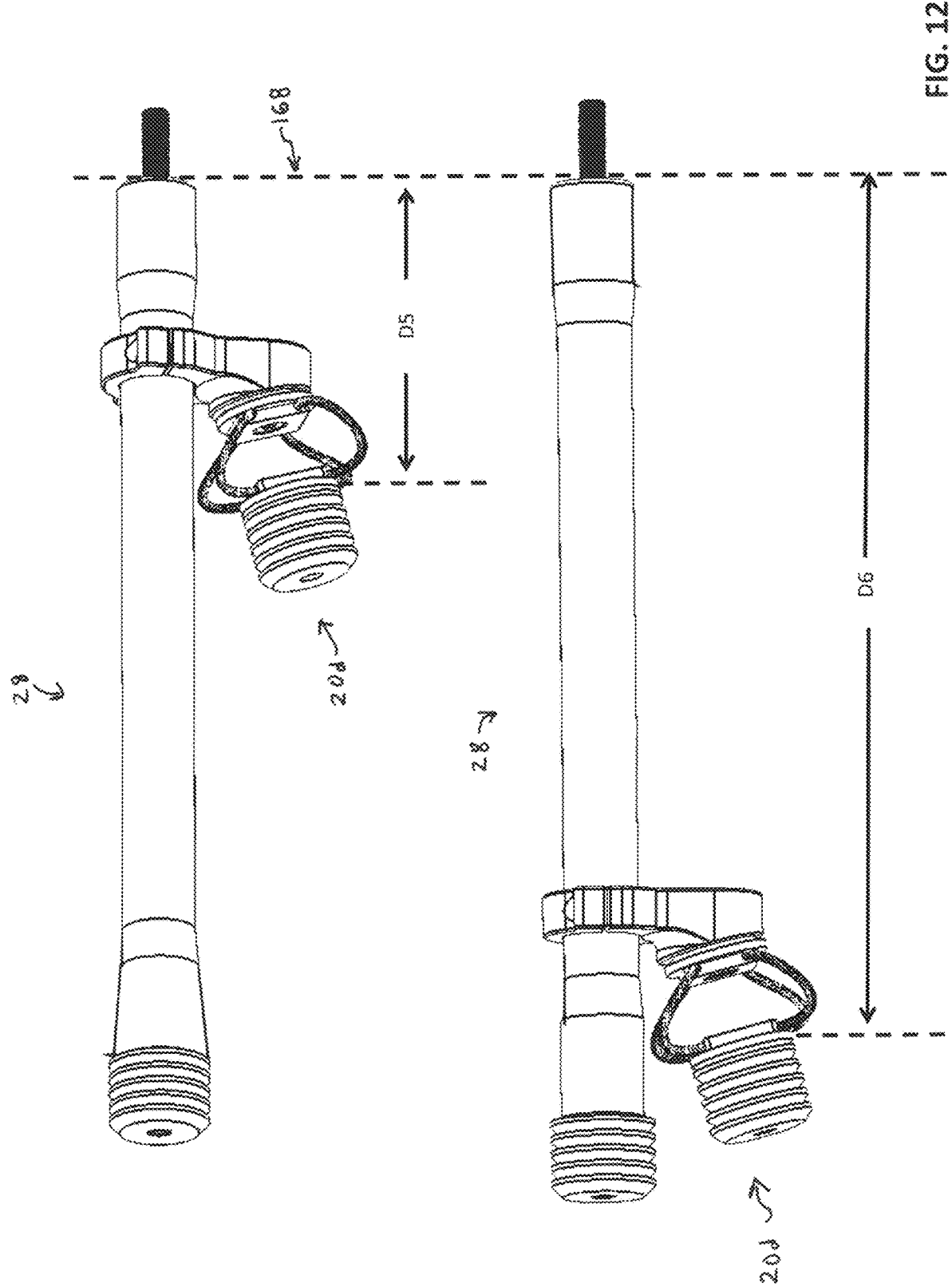

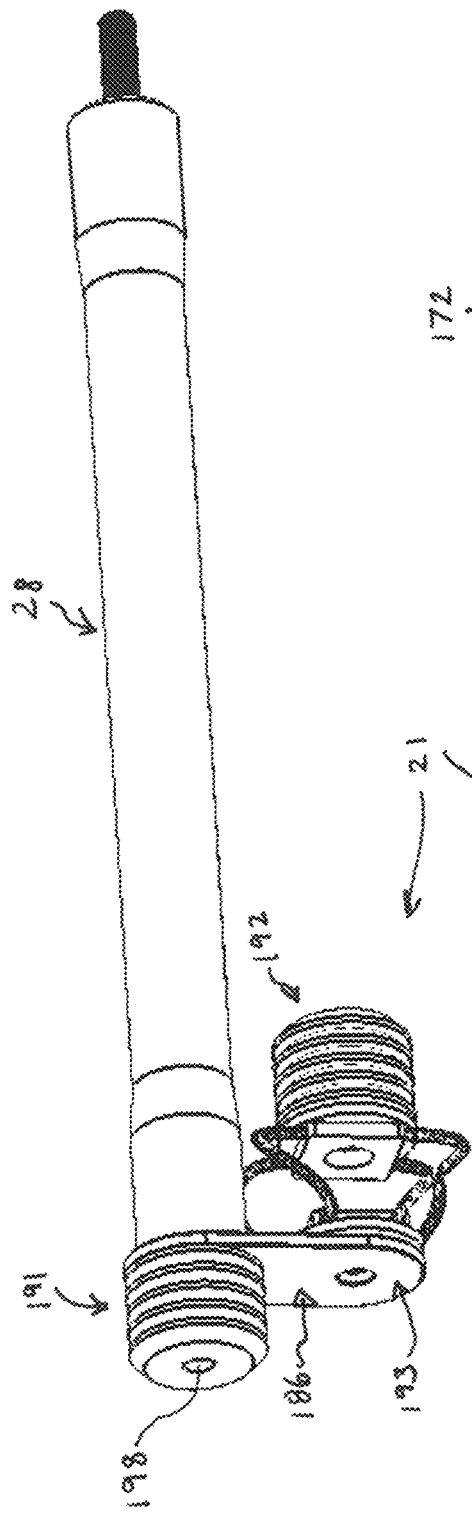

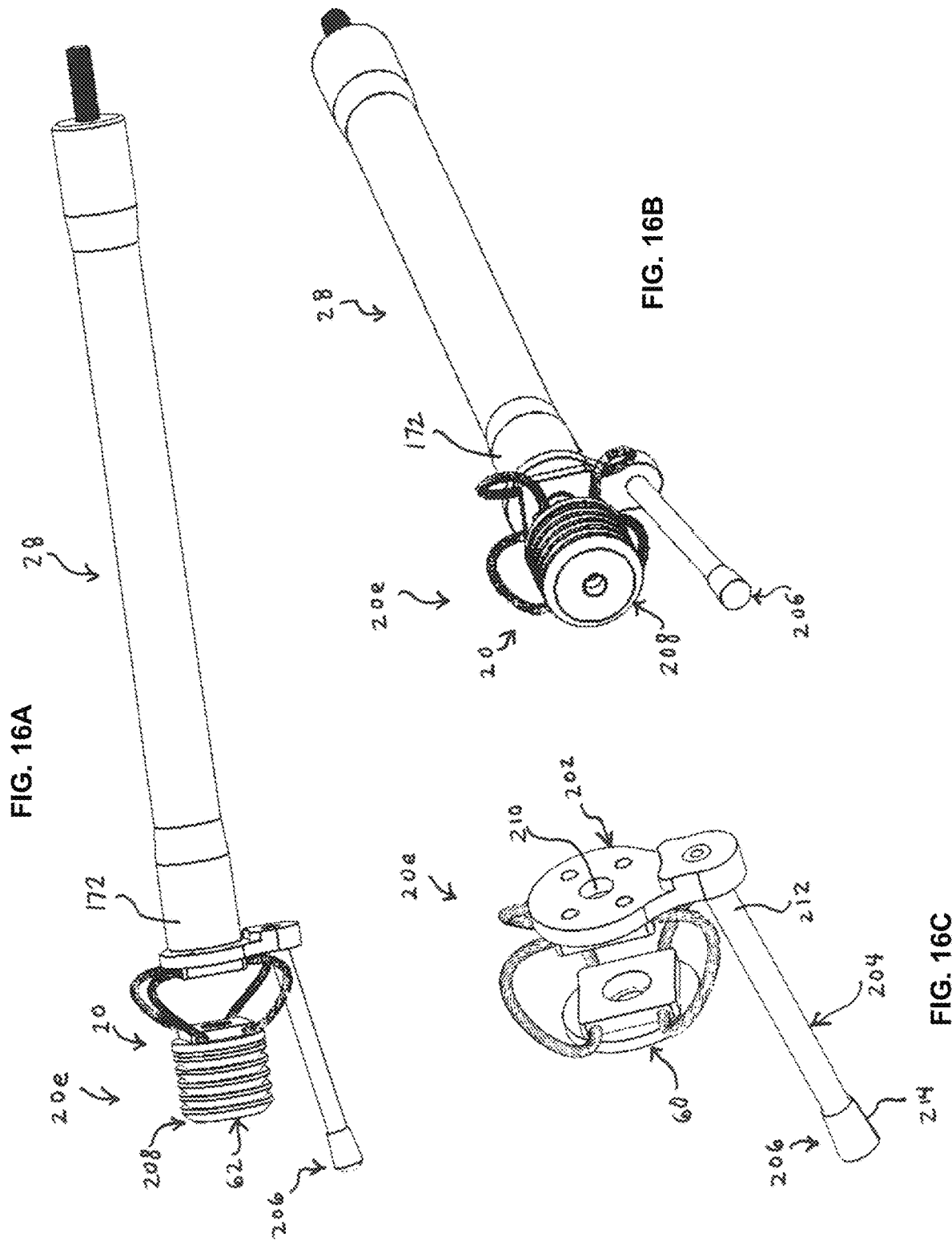

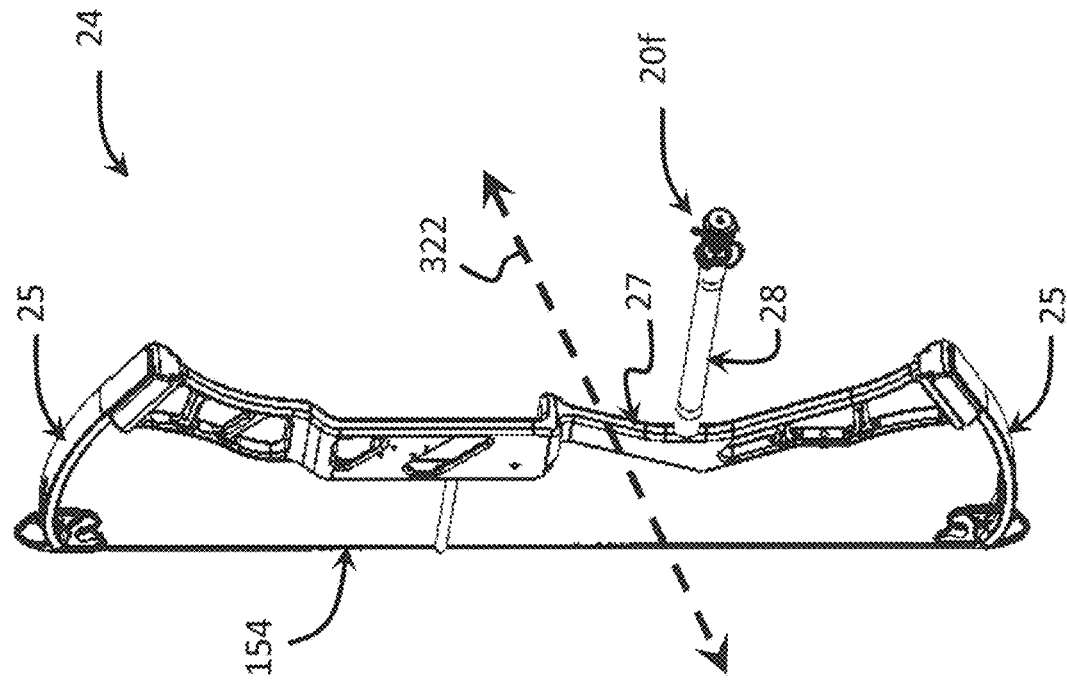
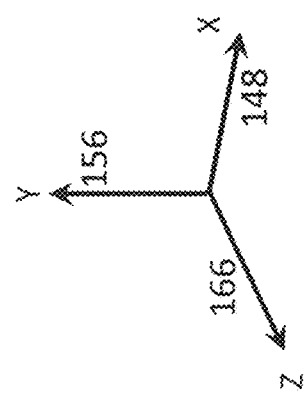
FIG. 17A

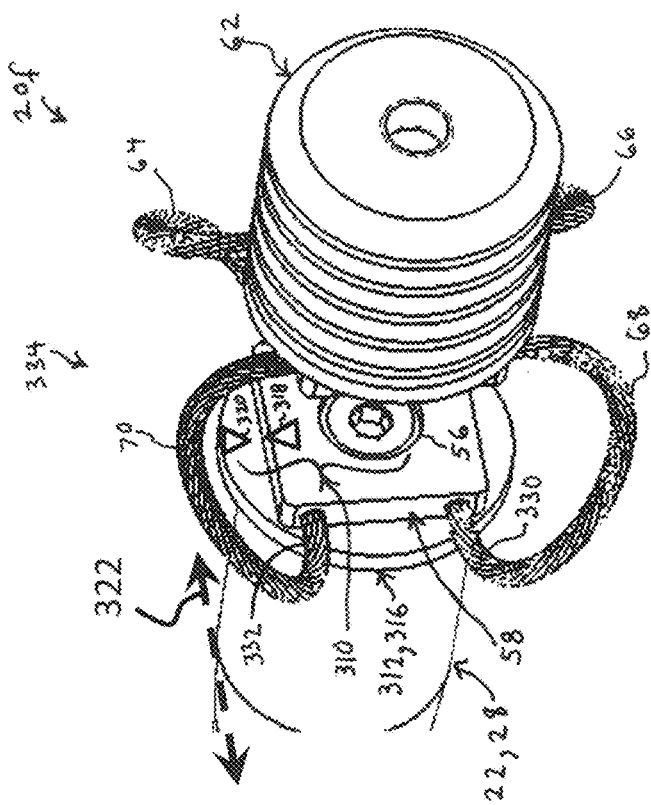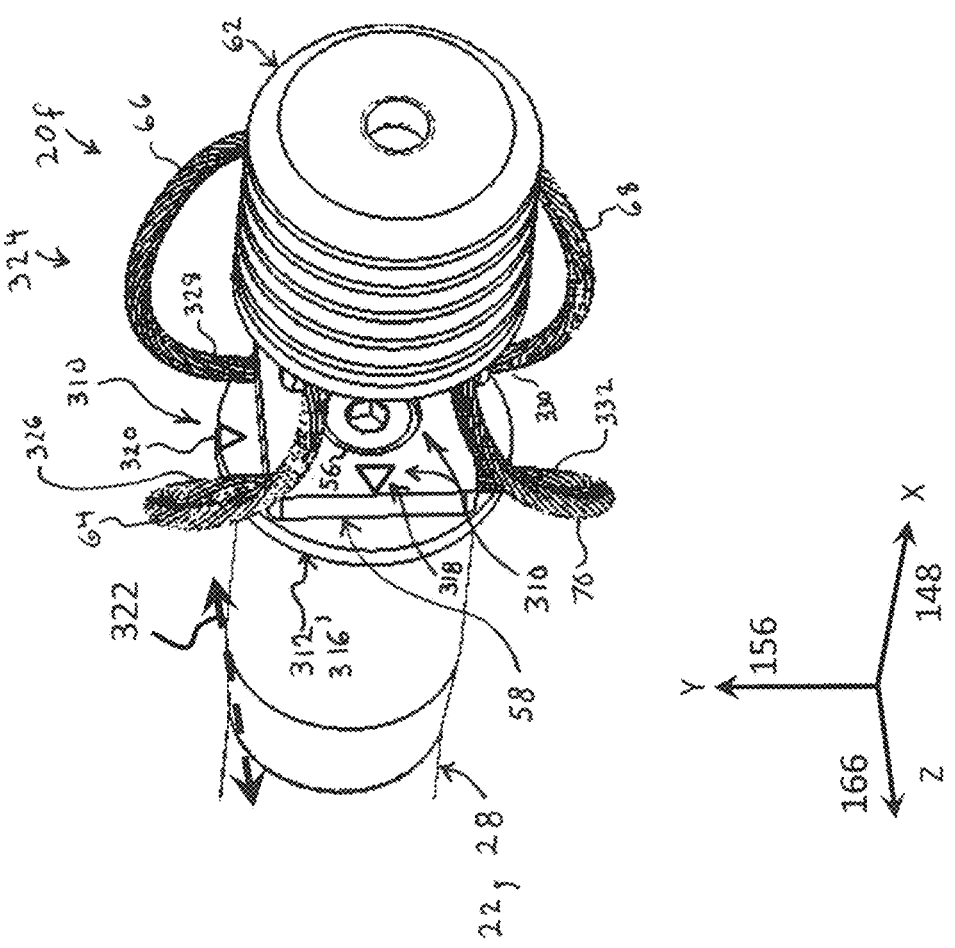

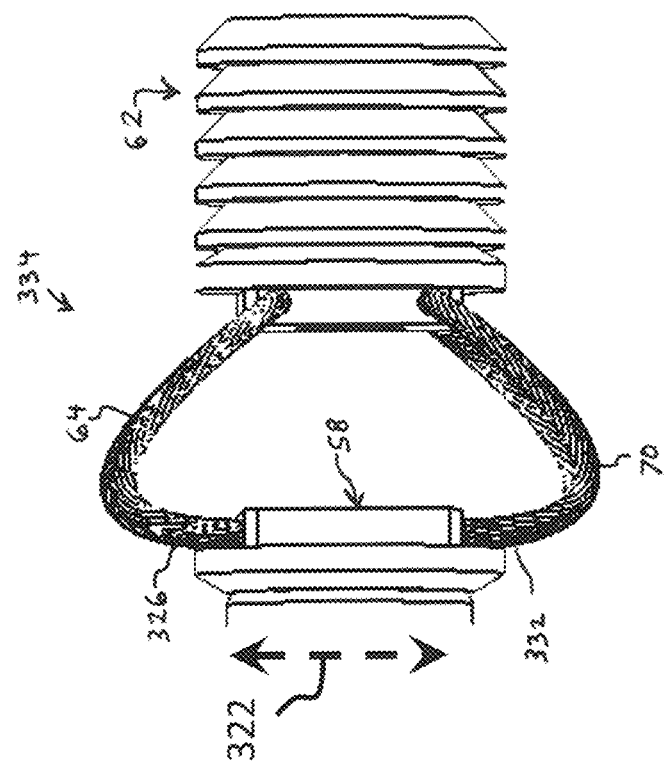
FIG. 17E
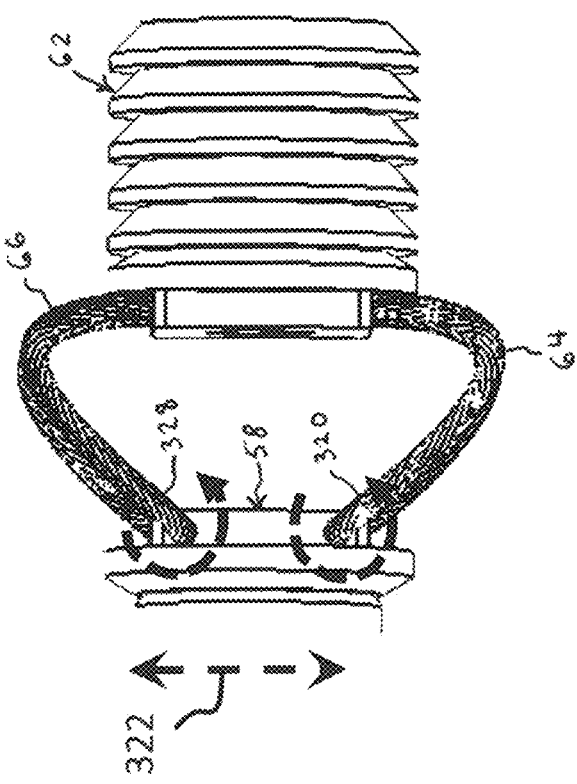
FIG. 17D
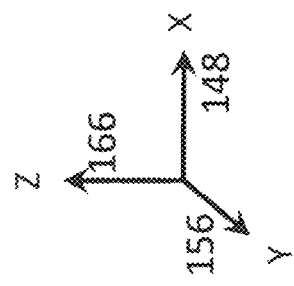

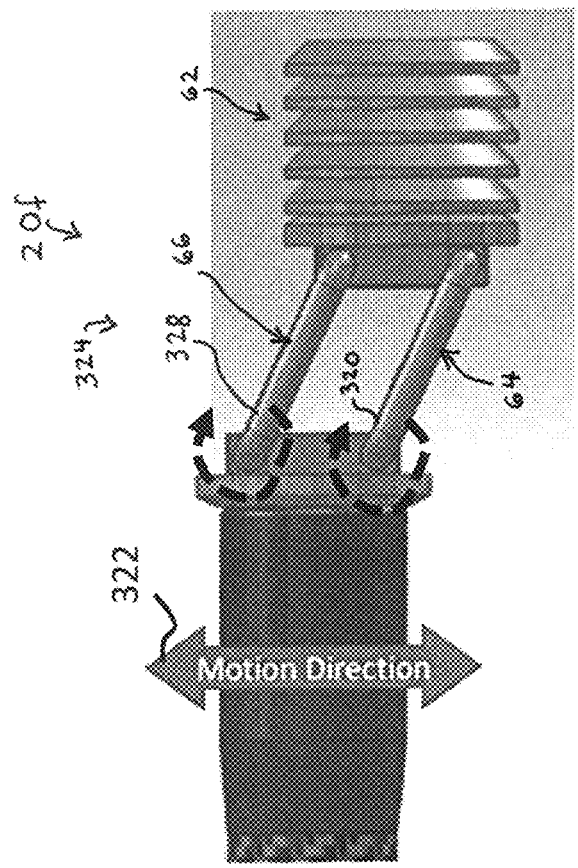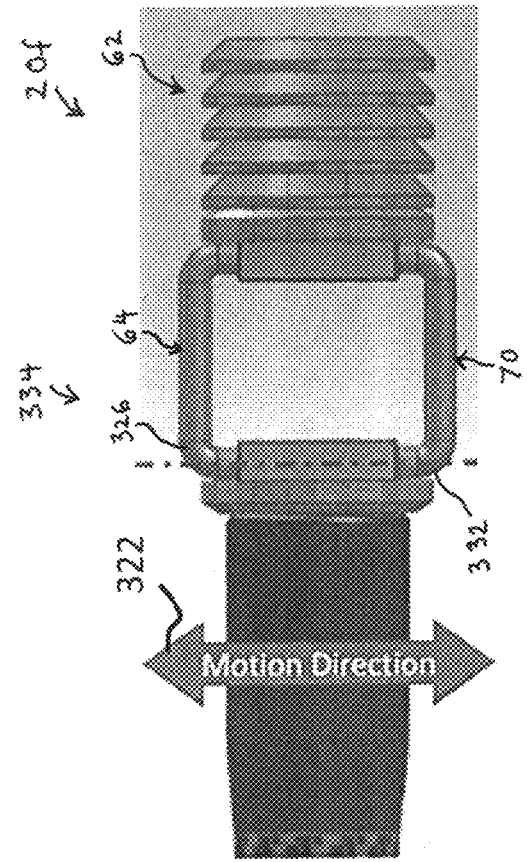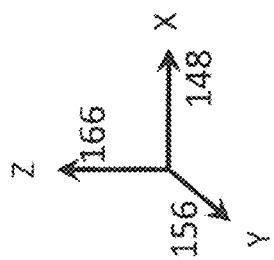
FIG. 17F
FIG. 17G

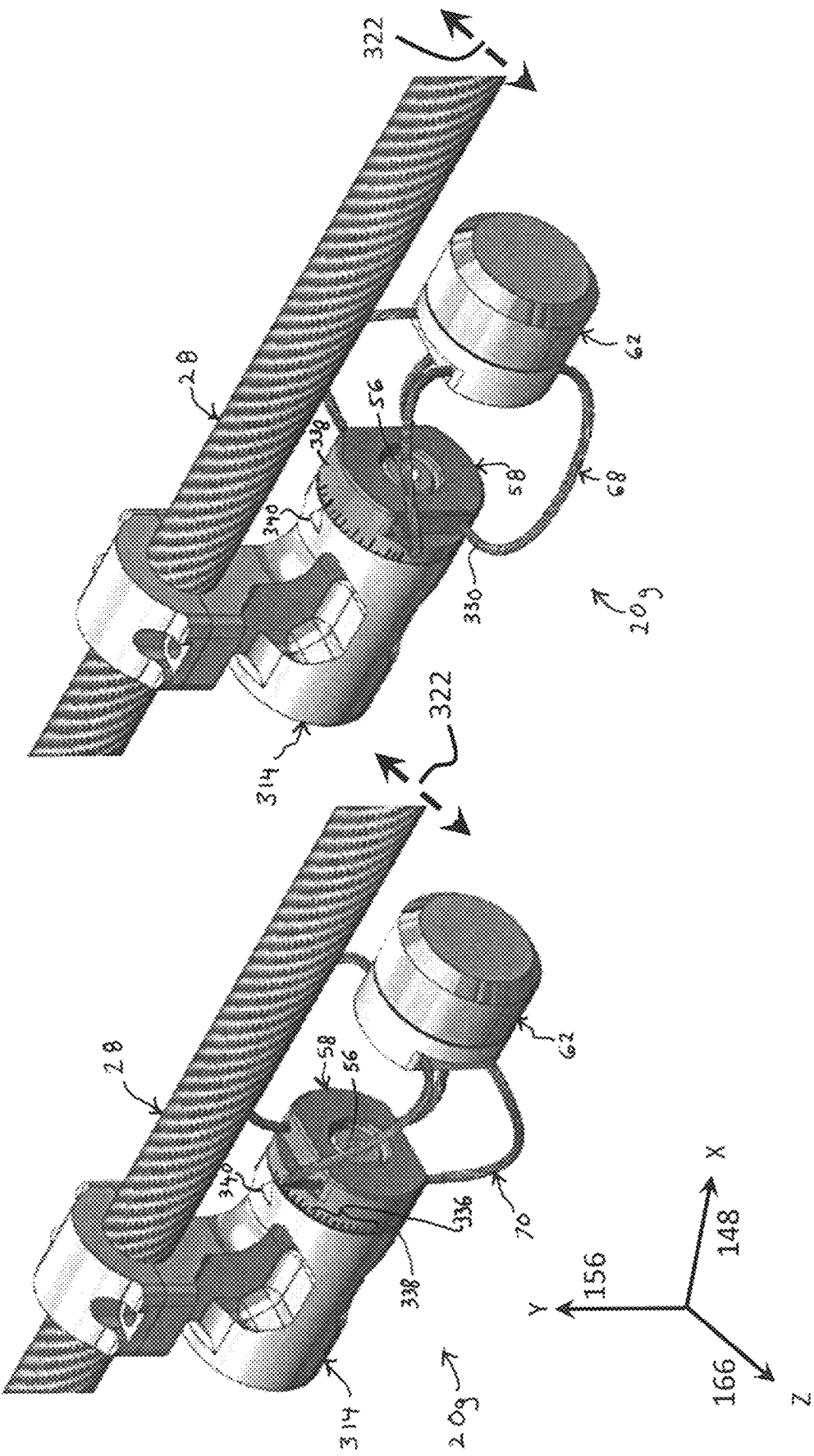

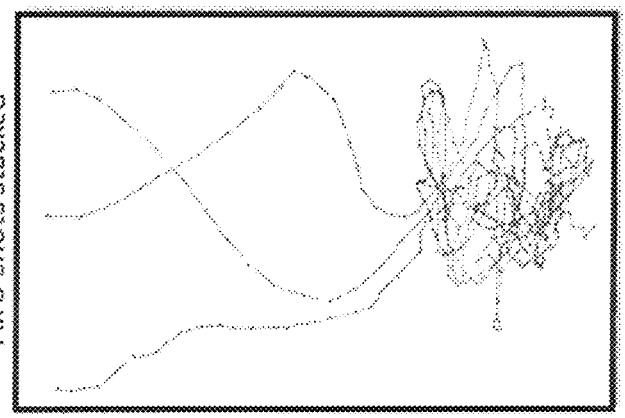
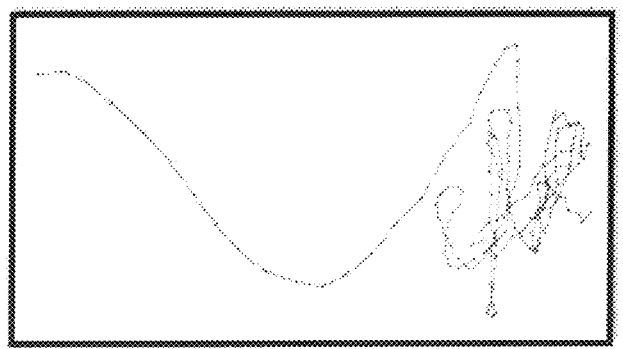
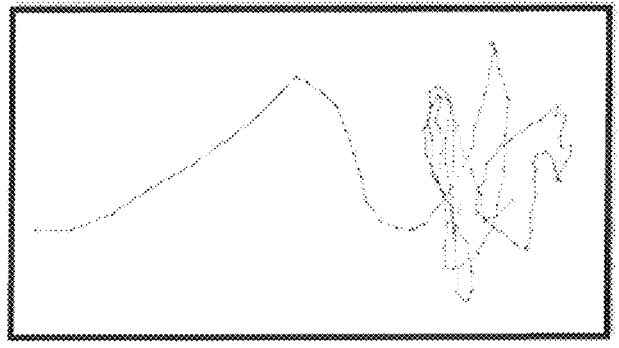
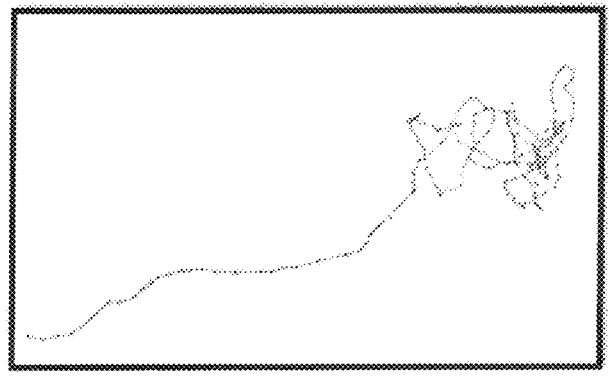
FIG. 25

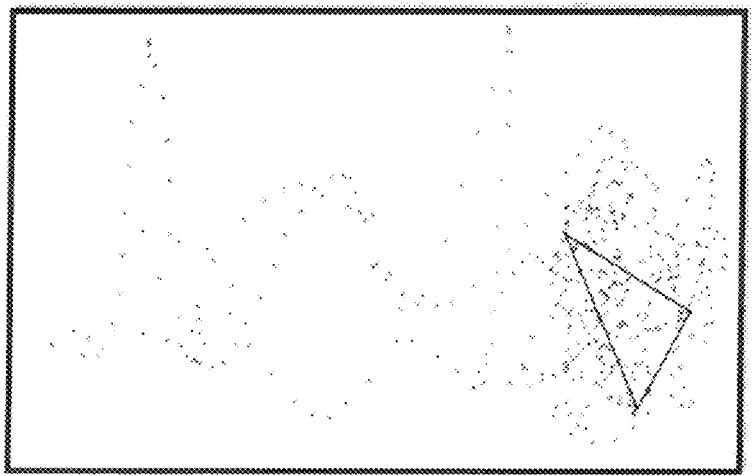
FIG. 28

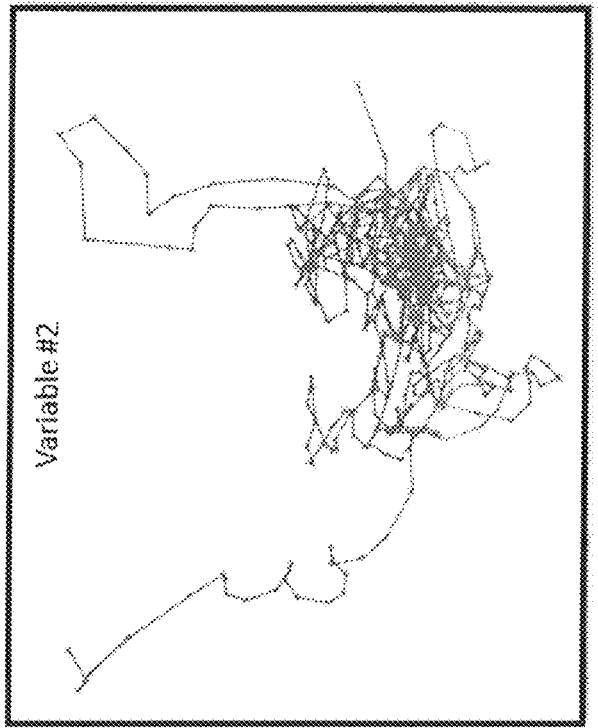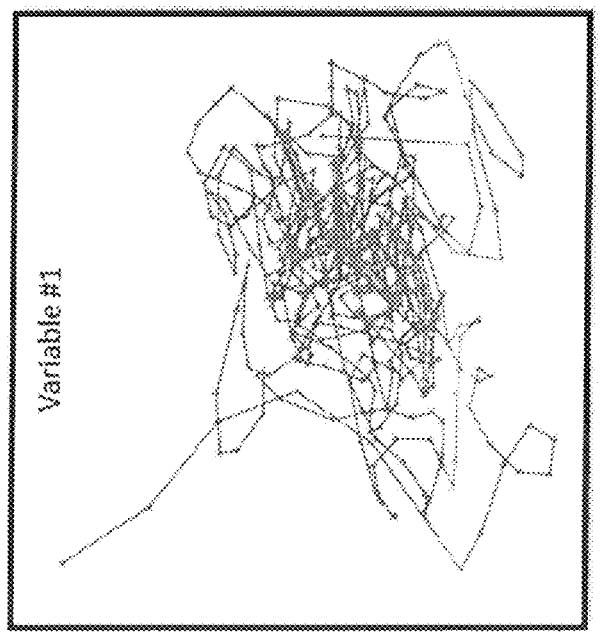
FIG. 29

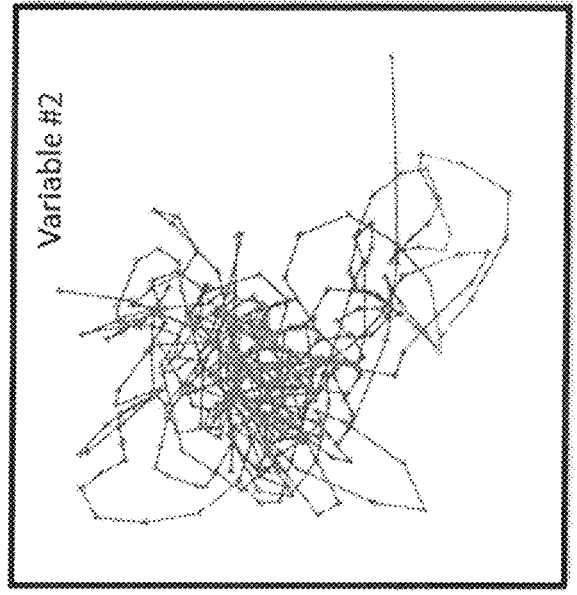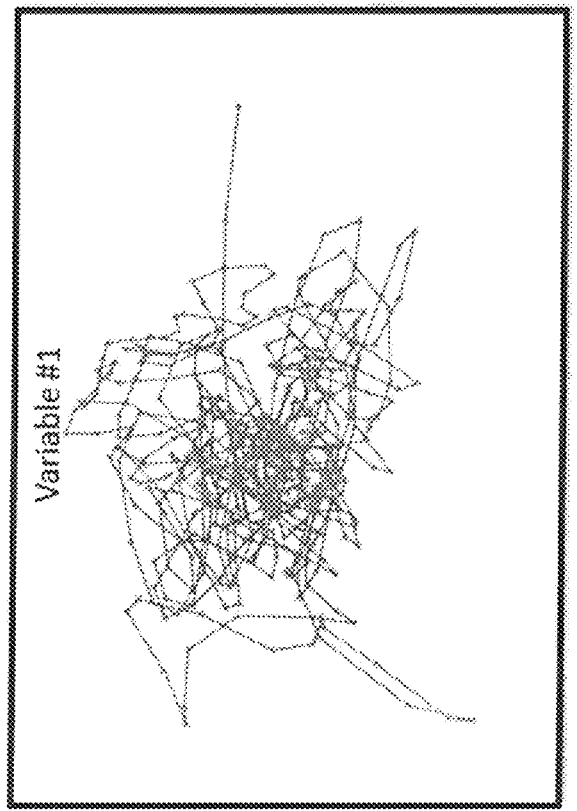
FIG. 30

Summary of Test Results

| Test | Description | Test Results |
|---|---|---|
| Test 1.A. | laser line length | 3.91% reduction of movement |
| Test 1.B. | Grouping size | 40.48% reduction in grouping size |
| Test 2 : test subject 1 | Aiming Drill with fixed timeline | 15.14% reduction of movement |
| Test 2 : Test subject 2 | Aiming Drill with fixed timeline | 19.61% reduction of movement |

FIG. 31

Comparison of Physical Attributes
| Description | Prior Art Damper | Energy Absorber | Result |
|---|---|---|---|
| Mass Weight | 47.00 grams | 32.9 grams | 30% decrease in mass weight |
| Cross Section | 4.02 surface area 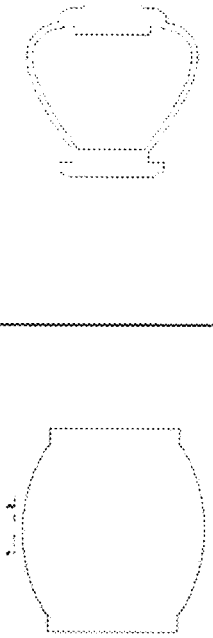 | 1.95 surface area 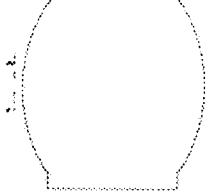 | 51.49% cross section reduction. |
FIG. 32

ENERGY ABSORBER AND METHOD FOR SHOOTING EQUIPMENT

CROSS-REFERENCE TO RELATED APPLICATION

This application is a non-provisional of, and claims the benefit and priority of, U.S. Provisional Patent Application No. 62/623,618 filed on Jan. 30, 2018. The entire contents of such application are hereby incorporated herein by reference.

BACKGROUND

Shooting devices, such as archery bows and firearms, can be relatively heavy. For example, compound bows and long range rifles can weigh over twenty pounds. When aiming, the user must hold the shooting device away from the user's body for a period of time. The user's arms can quickly tire. While aiming, the fatigued muscles can twitch or pulsate, and the user's arms and hands can shake. The twitching, pulsation and shaking causes vibration in the shooting device. Depending upon the strength of the user, the length of the aiming period and the weight of the shooting device, the magnitude of the vibration can be relatively high. For example, the shooting device can vibrate enough so that the vibration is noticeable to the eye. The continuous vibration of the shooting device can impede the user's ability to reach the desired aiming position in a timely fashion. The vibration can also make it difficult for the user to maintain the desired aiming position until ready to shoot. Therefore, the vibration can impair the user's aiming and shooting performance.

In addition, the shooting action of the shooting device generates a post-shooting force. The post-shooting force, which can be in the form of a shock, is caused by the mechanism that propels the projectile forward. In firearms, this post-shooting force, known as recoil, is caused by the explosion of the gun powder in the ammunition. In archery bows, this post-shooting force is caused by the spring action of the bow limbs. After the user releases the arrow, the bow limbs typically reverberate upward and downward causing upward and downward, post-shooting forces within the handgrip. The post-shooting forces can: transmit through the shooting device in the form of vibrational energy; accelerate the shooting device causing kickback or quick movements; or cause a combination of vibration and acceleration.

The effects of the post-shooting forces can be uncomfortable, harsh and even painful. Depending upon the type of shooting device, vibrational energy and acceleration can sting the hands or cause pain or injury to the arms, shoulders or other parts of the body. In sessions of continuous shooting, the continuous exposure to the vibrational energy can cause muscle fatigue and reduce the user's overall shooting abilities and performance.

For archery bows, there is a known dampener rod—an attempt to address the vibrational energy that occurs after the shooting. The dampener rod screws into the bow. The end of the dampener rod has a rubber damper. There are several disadvantages with the dampener rod. The rod's rubber damper fails to absorb a substantial amount of the post-shooting, vibrational energy in the bow. Also, the rubber damper fails to absorb the vibrational energy occurring during the aiming process before the shooting. Consequently, despite the use of the dampener rod, the user is subject to numerous challenges, including: aiming difficulties during the aiming process before shooting, impairment of shooting accuracy, and pain or discomfort after the shooting occurs.

The foregoing background describes some, but not necessarily all, of the problems, disadvantages and shortcomings related to the use of shooting devices.

SUMMARY

In an embodiment, an energy absorber includes a shooting equipment coupler configured to be coupled to a portion of shooting equipment. The energy absorber also includes a base configured to be coupled to the shooting equipment coupler. The base includes a first base portion and a second base portion. The energy absorber also includes a support. The support includes a support surface, a first support portion, and a second support portion. Also, the energy absorber includes: (a) a first cord segment that couples the base to the support, wherein the first cord segment extends from the first base portion to the first support portion; (b) a second cord segment that couples the base to the support, wherein the second cord segment extends from the second base portion to the second support portion; and (c) an object comprising a weight, wherein the object is coupled to the support surface. The object is configured to move relative to the base in response to vibrational energy in the shooting equipment. The first and second cord segments are configured to maintain a distance between the support surface and the base during the movement of the object. At least one of the cord segments is configured to flex relative to the base during the movement of the object. The flexing of the at least one cord segment causes an absorption of at least part of the vibrational energy.

In another embodiment, the energy absorber includes: (a) a shooting equipment coupler configured to be coupled to a portion of shooting equipment; (b) a base configured to be coupled to the shooting equipment coupler; (c) a support; (d) a plurality of cord segments that couple the base to the support, wherein the cord segments extend from the base to the support; and (e) an object coupled to the support. The base, the support and the cord segments are configured so that the cord segments: (i) have an initial shape before an aiming force is received by the shooting equipment; (ii) change to an aim response shape after the shooting equipment receives the aiming force; and (iii) change to a shot response shape after at least part of the shooting equipment receives a shot force.

Yet another embodiment includes a method for manufacturing an energy absorber. The method includes the following steps: (a) accessing a shooting equipment coupler that is configured to be coupled to a portion of shooting equipment; (b) coupling a base to the shooting equipment coupler; (c) accessing a support; (d) coupling a plurality of cord segments to the base and the support so that the cord segments extend from the base to the support; (e) coupling an object to the support; and (f) configuring the base, the support and the cord segments so that the cord segments: (i) have an initial shape before an aiming force is received by the shooting equipment; (ii) change to an aim response shape after the shooting equipment receives the aiming force; and (iii) change to a shot response shape after at least part of the shooting equipment receives a shot force.

Additional features and advantages of the present disclosure are described in, and will be apparent from, the following Brief Description of the Drawings and Detailed Description.

BRIEF DESCRIPTION OF THE DRAWINGS

FIG. 1A is a schematic diagram of different embodiments of energy absorbers coupled to different embodiments of shooting equipment.

FIG. 1B is a side view of an embodiment of an archery bow having a plurality of energy absorbers coupled to the archery bow.

FIG. 1C is a side view of an embodiment of a firearm having a plurality of energy absorbers coupled to the firearm.

FIG. 2A is a side, isometric view of an embodiment of an energy absorber, illustrating the weighted object removed.

FIG. 2B is a top, isometric view of an embodiment of the energy absorber of FIG. 2A, illustrating the weighted object attached.

FIG. 2C is a bottom, isometric view of the energy absorber of FIG. 2B.

FIG. 2D is a bottom, isometric view of the energy absorber of FIG. 2A.

FIG. 3 is a schematic diagram showing side views of examples of the variable shapes of the energy absorber of FIG. 2B.

FIG. 7 is a schematic diagram showing side views of examples of the variable shapes of the energy absorber of FIG. 2B, illustrating additional angular variations of the weighted object.

FIG. 12 is a schematic diagram showing side views of the forward-facing energy absorber of FIG. 10, illustrating the variable positions of the energy absorber along the bow stabilizer.

FIG. 15A is another isometric view of the energy absorber assembly of FIG. 14A.

FIG. 15B is another exploded, isometric view of the energy absorber assembly of FIG. 14A.

FIG. 16A is an isometric view of an embodiment of an energy absorber coupled to a bow stabilizer, illustrating the guard of the energy absorber.

FIG. 16B is another isometric view of the energy absorber of FIG. 16A.

FIG. 16C is an enlarged, isometric view of the energy absorber of FIG. 16A, illustrating the weighted object removed.

FIG. 17A is a front, isometric view of an embodiment of an archery bow having an embodiment of an energy absorber attached to a bow stabilizer, illustrating lateral-directed shot forces.

FIG. 17B is an enlarged, isometric view of the energy absorber of FIG. 17A, illustrating a first lateral resistance position of the energy absorber relative to the bow stabilizer.

FIG. 17C is an enlarged, isometric view of the energy absorber of FIG. 17A, illustrating a second lateral resistance position of the energy absorber relative to the bow stabilizer.

FIG. 17D is an enlarged, side view of the energy absorber of FIG. 17B, illustrating the first lateral resistance position of the energy absorber relative to the bow stabilizer.

FIG. 17E is an enlarged, side view of the energy absorber of FIG. 17C, illustrating the second lateral resistance position of the energy absorber relative to the bow stabilizer.

FIG. 17F is a side view of an embodiment of an energy absorber coupled to a bow stabilizer, illustrating stem pivoting for a first lateral resistance position of the energy absorber relative to the bow stabilizer.

FIG. 17G is a side view of an embodiment of an energy absorber coupled to a bow stabilizer, illustrating stem pivoting for a second lateral resistance position of the energy absorber relative to the bow stabilizer.

FIG. 17H is an isometric view of an embodiment of an energy absorber coupled to a bow stabilizer, illustrating a first adjustable position of the base relative to a base measurement indicator of the energy absorber.

FIG. 17I is an isometric view of an embodiment of an energy absorber coupled to a bow stabilizer, illustrating a second adjustable position of the base relative to a base measurement indicator of the energy absorber.

FIG. 25 is a schematic diagram illustrating the results of test #1 for variable #2.

FIG. 28 is a schematic diagram further illustrating the second result comparison (1.B) of variable #1 and variable #2 for test #1.

FIG. 29 is a schematic diagram illustrating a result comparison of variable #1 and variable #2 for test #2, using a first test subject.

FIG. 30 is a schematic diagram illustrating a result comparison of variable #1 and variable #2 for test #2, using a second test subject.

FIG. 31 is a table illustrating a summary of test results.

FIG. 32 is a table illustrating a comparison of physical attributes.

DETAILED DESCRIPTION

Figure 4:
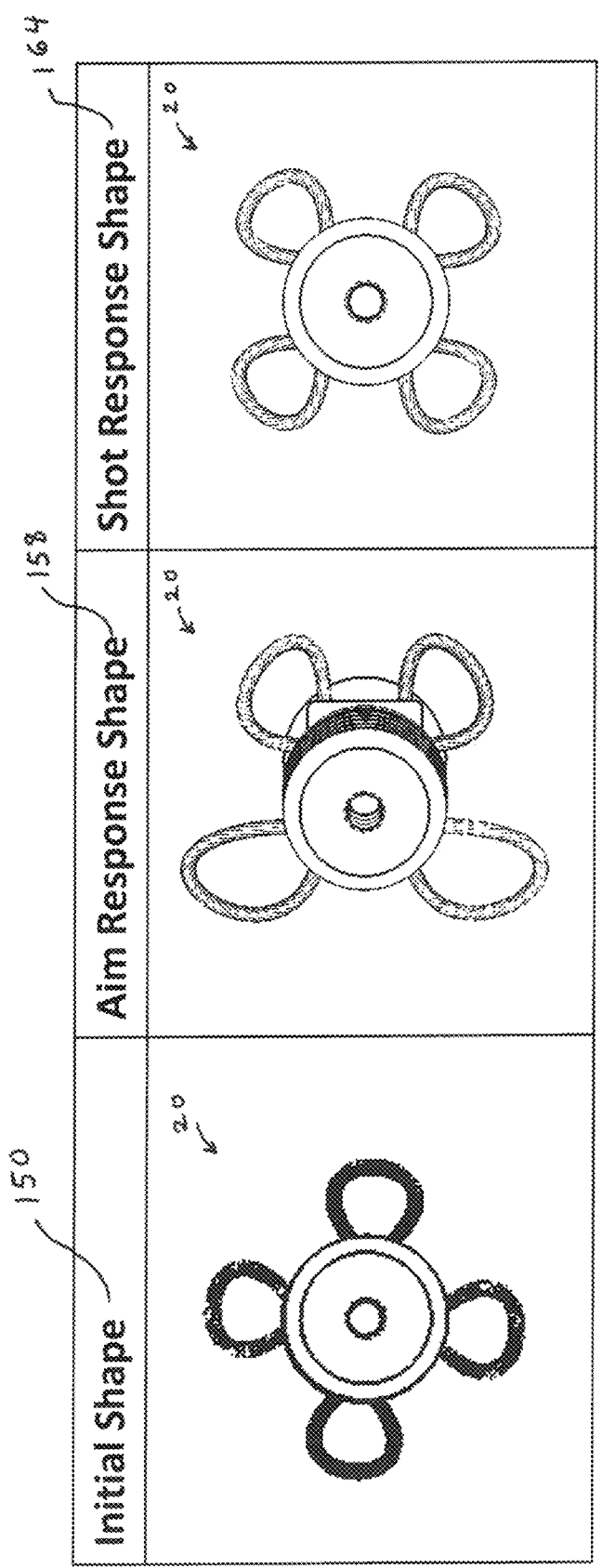
FIG. 4 is a schematic diagram showing top views of examples of the variable shapes of the energy absorber of FIG. 2B.

As illustrated in FIGS. 1A-1C, the energy absorber 20, in an embodiment, is configured to be incorporated into, mounted to or otherwise coupled to shooting equipment 22. The shooting equipment 22 can include a shooting device such as an archery bow 24 (e.g., the compound bow illustrated in FIG. 1B), a crossbow, a recurve bow or any other type of spring-based, projectile launcher. The bow 24, in an embodiment, includes a plurality of flexible limbs 25, a grasp, handle or handgrip 27, and a bowstring or drawcord 154. The shooting equipment 22 can also include a shooting device such as a firearm 26 (e.g., the long range rifle illustrated in FIG. 1C), a fully or partially automatic rifle, a handgun or any other type of ammunition-based weapon. In addition, the shooting equipment 22 can include a shooting accessory that is configured to be coupled to a shooting device. For example, the shooting accessory can include a bow stabilizer 28 (FIG. 1B) for the bow 24.

In an embodiment shown in FIG. 1A, the energy absorber 20 is configured to be directly mounted or coupled to the shooting equipment 22 as shown in the direct mounting arrangement 30. In the direct mounting arrangement 30, the energy absorber 20 includes a shooting equipment coupler 56, as illustrated in FIG. 2C. In another embodiment shown in FIG. 1A, the energy absorber 20a includes a shooting equipment coupler 32 which is configured to be mounted or coupled to shooting equipment 22 as shown in the indirect mounting arrangement 34. Depending upon the embodiment, the shooting equipment coupler 32 can be configured to receive and surround a portion of the shooting equipment 22 or otherwise mate with, interlock with or entrap a portion of the shooting equipment 22.

In an embodiment, the shooting equipment coupler 32 has one or more guards 36, 38. Each of the guards 36, 38 has a rigid characteristic and is configured to extend beyond the distal end 40 of the weighted object 62. In this way, the one or more guards 36, 38 protect the energy absorber 20 from coming into contact with the ground, trees, transportation environments and other objects that could deform or damage the energy absorber 20. In an embodiment, the guards 38, 38 are connected to guard 42 to form a rigid encasement or housing 44 that surrounds or houses the weighted object 62.

In the example shown in FIG. 1C, the energy absorber 20b includes a stock coupler 46 configured to receive and clamp onto the stock 48 of the firearm 26. Also, the energy absorber 20c includes a forestock coupler 50 configured to be screwed, bolted or otherwise fastened to the grasp or forestock 52 of the firearm 26. Also, in the example shown in FIG. 1B, the energy absorber 20d includes a bow stabilizer coupler 54 configured to receive and clamp onto the bow stabilizer 28 of the archery bow 24.

It should be understood that the shooting equipment 22, when in use, can receive or generate a plurality of different types of forces. These forces can transmit and propagate through the grasp, body and material of the shooting equipment 22. Also, these forces can cause or generate vibrational energy within the shooting equipment. Depending upon the usage mode of the shooting equipment 22, these forces can include: (a) aiming forces that are transmitted from the user's body to the shooting equipment 22 during an aiming period before shooting; (b) post-shooting forces or shot forces that are transmitted: (i) from the projectile (e.g., arrow or ammunition unit) to the shooting equipment 22; or (ii) from launching parts of the shooting equipment 22 to the handle, grasp or body of the shooting equipment 22; and (c) other forces that are transmitted to the shooting equipment 22 before, during or after shooting. These other forces can originate from various sources, including, but not limited to, environmental elements, such as wind, rain, snow and movement of a user support surface, such as trees, water and vehicles.

In an embodiment illustrated in FIGS. 2A-2D, the energy absorber 20 has a tuned mass damper configuration. The energy absorber 20 is operable to reduce the amplitude of undesirable, harmonic vibrations in the shooting equipment 22. In this embodiment, the energy absorber 20 includes: (a) a shooting equipment coupler 56 configured to be screwed into a threaded, female portion of the shooting equipment 22; (b) a base 58 connected to the shooting equipment coupler 56; (c) a mount or support 60 configured to hold or support a weighted object 62; (d) an object coupler 63 configured to be screwed into a threaded, female portion of the weighted object 62; and (e) a plurality of cord segments 64, 66, 68, 70 extending between the base 58 and the support 60.

Although, in the illustrated embodiment, the shooting equipment coupler 56 includes a base fastener (e.g., an insert or a threaded shaft, rod or bolt), in other embodiments, the shooting equipment coupler 56 can include a threaded, female portion configured to receive and threadingly engage with a threaded member of the shooting equipment 22. In yet other embodiments, the shooting equipment coupler 56 can include a locking pin, slot-groove element, joint, set screw, weld portion or any other suitable fastening element operable to fasten or secure the energy absorber 20 to the shooting equipment 22.

In an embodiment, the base 58 includes a circular or disk-shaped equipment interface 74. The base 58 also has a base cord receiver 76 that is compressed against the equipment interface 74 when the shooting equipment coupler 56 is screwed into the shooting equipment 22. Depending upon the embodiment, the equipment interface 74 can be integral with or separable from the base cord receiver 76. The equipment interface 74 and base cord receiver 76 define a passageway (not shown) configured to receive the shooting equipment coupler 56. In addition, the base cord receiver 76 defines a countersink cavity 79, greater in diameter than such passageway, configured to receive the head 78 of the shooting equipment coupler 56.

The base cord receiver 76 has a plurality of base portions 80, 82, 84, 86. The base portions 80, 82, 84, 86 define cavities or openings (not shown) configured to receive proximal cord portions 88, 90, 92, 94 respectively, of the cord segments 64, 66, 68, 70, respectively. Depending upon the embodiment, the proximal cord portions 88, 90, 92, 94 may or may not be the ends of the cord segments 64, 66, 68, 70, respectively. For example, in the embodiment in which the cord segment 64 is continuously connected to the cord segment 66 and the cord segment 68 is continuously connected to the cord segment 70, the proximal cord portions 88, 90, 92, 94 are not cord ends.

Referring to FIG. 2B, the proximal cord portions 88, 94, located opposite of each other, are each oriented so as to extend in a base direction 97. Likewise, the proximal cord portions 90, 92, located opposite of each other, are each oriented so as to extend in a base direction 99.

Depending upon the embodiment, the base cord receiver 76 can define an interior cavity. In an embodiment, the base cord receiver 76 defines a base cord passageway 96 and a base cord passageway 98. In such embodiment: (a) the cord segment 64 is continuously connected to the cord segment 66 through a first base cord segment (not shown) positioned within the base cord passageway 96; and (b) the cord segment 68 is continuously connected to the cord segment 70 through a second base cord segment (not shown) positioned within the base cord passageway 98.

Although, in the illustrated embodiment, the object coupler 63 includes a support fastener (e.g., a threaded shaft, rod or bolt), in other embodiments, the object coupler 63 can include a threaded, female portion configured to receive and threadingly engage with a threaded member of the weighted object 62. In yet other embodiments, the object coupler 63 can include a locking pin, slot-groove element, joint, set screw, weld portion or any other suitable fastening element operable to fasten or secure the weighted object 62 to the support 60.

In an embodiment, the support 60 includes a circular or disk-shaped object interface 102. The support 60 also has a support cord receiver 104. The support cord receiver 104 has a support surface that is compressed against the object interface 102 when the object coupler 63 is screwed into the weighted object 62. Depending upon the embodiment, the object interface 102 can be integral with or separable from the support cord receiver 104. The object interface 102 and support cord receiver 104 define a passageway (not shown) configured to receive the object coupler 63. In addition, the support cord receiver 104 defines a countersink cavity 107, greater in diameter than such passageway, configured to receive the head 106 of the object coupler 63.

The support cord receiver 104 has a plurality of support portions 108, 110, 112, 114. The support portions 108, 110, 112, 114 define cavities or openings (not shown) configured to receive distal cord portions 116, 118, 120, 122, respectively, of the cord segments 64, 66, 68, 70, respectively. Depending upon the embodiment, the distal cord portions 116, 118, 120, 122 may or may not be the ends of the cord segments 64, 66, 68, 70, respectively. For example, in the embodiment in which the cord segment 64 is continuously connected to the cord segment 66 and the cord segment 68 is continuously connected to the cord segment 70, the distal cord portions 116, 118, 120, 122 are not cord ends.

Referring to FIG. 2D, the distal cord portions 116, 118, located opposite of each other, are each oriented so as to extend in a support direction 101. Likewise, the distal cord portions 120, 122, located opposite of each other, are each oriented so as to extend in a support direction that is coaxial with the passageway 126. In the embodiment shown, the support direction 101 (FIG. 2D) extends at ninety degree angle relative to the base direction 97 (FIG. 2B). Likewise, the support direction that is coaxial with the passageway 126 (FIG. 2D) extends at ninety degree angle relative to the base direction 99 (FIG. 2B).

Depending upon the embodiment, the support cord receiver 104 can define an interior cavity. In an embodiment, the support cord receiver 104 defines a support cord passageway 124 and a support cord passageway 126. In such embodiment: (a) the cord segment 64 is continuously connected to the cord segment 66 through a first support cord segment (not shown) positioned within the support cord passageway 124; and (b) the cord segment 68 is continuously connected to the cord segment 70 through a second support cord segment (not shown) positioned within the support cord passageway 126.

As illustrated in FIG. 2A, the base cord receiver 76 is oriented, about longitudinal base axis 128, at an angle of ninety degrees relative to the support cord receiver 104. In particular, the base cord receiver 76 has a base cord-receiving face 130 facing in a direction 134, and the support cord receiver 104 has a support cord-receiving face 132 facing in a direction 136. As shown, direction 134 is oriented at an angle of ninety degrees relative to direction 136.

In an embodiment, the base 58 defines a plurality of base access channels 138, and the support 60 defines a plurality of support access channels 140. The base access channels 138 provide access to the proximal cord portions 88, 90, 92, 94 within the base 58, and the support access channels 140 provide access to the distal cord portions 116, 118, 120, 122 within the support 60. Also, each of the access channels 138, 140 is threaded and configured to threadingly engage with a threaded cord securement fastener (not shown). In an embodiment, to assemble the energy absorber 20, the assembler performs the following method: (a) insert the proximal cord portions 88, 90, 92, 94 into the base 58; (b) insert the distal cord portions 116, 118, 120, 122 into the support 60; and (c) screw a cord securement fastener into each one of the access channels 138, 140. The cord securement fasteners make contact with and compress the portions of the proximal cord portions 88, 90, 92, 94 within the base 58 and the portions of the distal cord portions 116, 118, 120, 122 within the support 60. Accordingly, the cord securement fasteners immobilize the proximal cord portions 88, 90, 92, 94 relative to the base 58 and immobilize the distal cord portions 116, 118, 120, 122 relative to the support 60.

In an embodiment, the cord segments 68, 70, 72, 74 are sections of a continuous cord that winds through the base cord receiver 76 and the support the cord receiver 104. In another embodiment, the cord segments 68, 70, 72, 74 are separate cords that extend from the base cord receiver 76 to the support cord receiver 104. In either case, each of the cord segments 68, 70, 72, 74 is flexible and has: (a) a suspension characteristic; and (b) a spring characteristic, dampening characteristic or absorption characteristic. The suspension characteristic enables the cord segments 68, 70, 72, 74 to isolate the weighted object 62 from the shooting equipment 22. The spring or dampening characteristic enables the cord segments 68, 70, 72, 74 to dampen or absorb vibrational energy that is transmitting through the shooting equipment 22. Based on these dual suspension and dampening characteristics, the energy absorber 20 is operable as an isolator with substantially improved shot and vibration absorption compared to the prior art damper described above.

Depending upon the embodiment, each of the cord segments 68, 70, 72, 74 can include one or more wires, ropes, cables, strands or fibers, or a twisted bundle of any other foregoing elements. When arranged in the form of loops within the energy absorber 20, the cord segments 68, 70, 72, 74 have an elastic characteristic. In response to an external force (e.g., vibrational force), the cord segments 68, 70, 72, 74 are configured to deform. When the external force is removed, the cord segments 68, 70, 72, 74 are configured to return to their original or initial shapes.

The cord segments 68, 70, 72, 74 can be constructed of any suitable material, including, but not limited to, metal, steel, polymer or any combination thereof. In the embodiment shown, each of the cord segments 68, 70, 72, 74 includes a wire rope having a plurality of strands of metal wire arranged in a helical shape. In an embodiment, each of the cord segments 68, 70, 72, 74 includes a dampening core (e.g., a natural or synthetic rubber strand) surrounded by a plurality of strands of metal wire arranged in a helical shape. This dampening core enhances the capacity of the energy absorber 20 to dampen or absorb vibrational energy that is transmitting through the shooting equipment 22.

In an embodiment, the weighted object 62 is an object having a mass associated with or corresponding to a designated weight. The designated weight is associated with the oscillation, dampening or absorption function of the energy absorber 20. The weight of the weighted object 62 depends on the mass of the weighted object 62 which, in turn, depends on the density, size and material type of the weighted object 62. In an embodiment, the weighted object 62 is a solid metal object having a tubular, interior surface 142 defining a fastening opening or fastening channel 144. The interior surface 142 is threaded and configured to threadingly mate with the object coupler 63. To attach the weighted object 62 to the support 60, a user can insert the object coupler 63 through the passageway extending from the countersink cavity 107. Next, the user can insert the object coupler 63 into the fastening channel 144 and then rotate the weighted object 62 about the object coupler 63 until the weighted object 62 is tightly compressed against the support 60.

It should be appreciated that the weighted object 62 can have a variety of configurations. For example, the fastening channel 144 does not have to extend entirely through the weighted object 62. Instead, the fastening channel 144 can extend only partway through the weighted object 62. Also, the weighted object 62 can have a plurality of separable weight components 146. In such embodiment, the user can increase or decrease the total weight of the weighted object 62 by adding one or more weight components 146 to the weighted object 62 or by removing one or more weight components 146 from the weighted object. In addition, the weighted object 62 can be partially porous, define one or more interior cavities and be constructed of any suitable materials, including, but not limited to, aluminum, steel, metal, plastic, rubber, liquid or any suitable polymer. In an embodiment, the weighted object 62 includes a dampening material, such as: (a) a natural or synthetic rubber layer that covers part or all of the exterior surface of the weighted object 62; or (b) a natural or synthetic rubber insert that fits at least partially within the weighted object 62. In such embodiment, the weighted object 62 is configured to dampen or otherwise absorb vibrational energy that is transmitting through the shooting equipment 22.

Referring back to FIGS. 1A-1C, the energy absorbers 20, 20a, 20b, 20c can be coupled to shooting equipment 22 at various angles. As shown in FIGS. 1A-2D, the shooting equipment coupler 56 extends along the longitudinal base axis 128. Also, the object coupler 63 extends along a longitudinal support axis 129. As shown, at the start of the aiming period, the longitudinal base axis 128 is collinear with the longitudinal support axis 129, forming an initial axis 131 (FIG. 1A). The energy absorber 20, when coupled to shooting equipment 22 aimed at a shooting target, can be oriented so that the initial axis 131 is parallel to the horizontal or X-axis 148 (FIG. 1A), is angled below X-axis 148 or is angled above X-axis 148. It should be appreciated that the angle of the initial axis 131 relative to the ground will depend on how the user is holding and positioning the shooting equipment 22 relative to the ground. This angle can change during and after the user's aiming period.

During the use and operation of the shooting equipment 22, the shooting equipment 22 can receive or generate a plurality of different forces along different force paths, including fore-aft forces acting along the X-axis 148, Y-axis 156 and the Z-axis 166. For example, as illustrated in FIG. 1B, upon the user's release of the drawcord 154 of the archery bow 24, the limbs 25 reverberate upward and downward along the Y-axis 156 causing upward and downward, post-shooting forces or shot forces along the Y-axis 156 within the handgrip 27. In addition, some of these shot force act outward along the X-axis 148 toward the target (not shown), in some cases urging the archery bow 24 to "jump" out of the user's hand toward the target.

Figure 8:
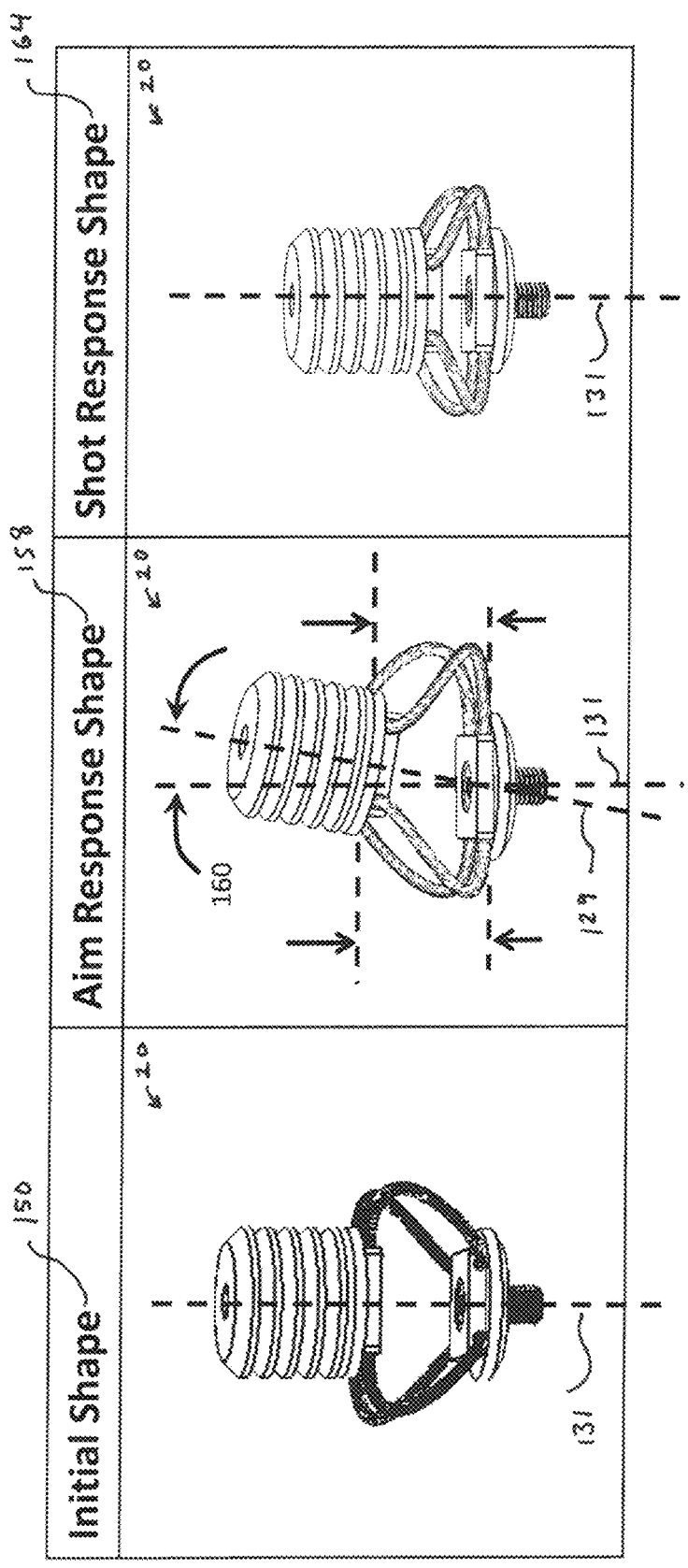
FIG. 8 is a schematic diagram showing side views of examples of the variable shapes of the energy absorber of FIG. 2B, illustrating additional spatial variations between the base and support as well as additional angular variations of the weighted object.
Figure 9:
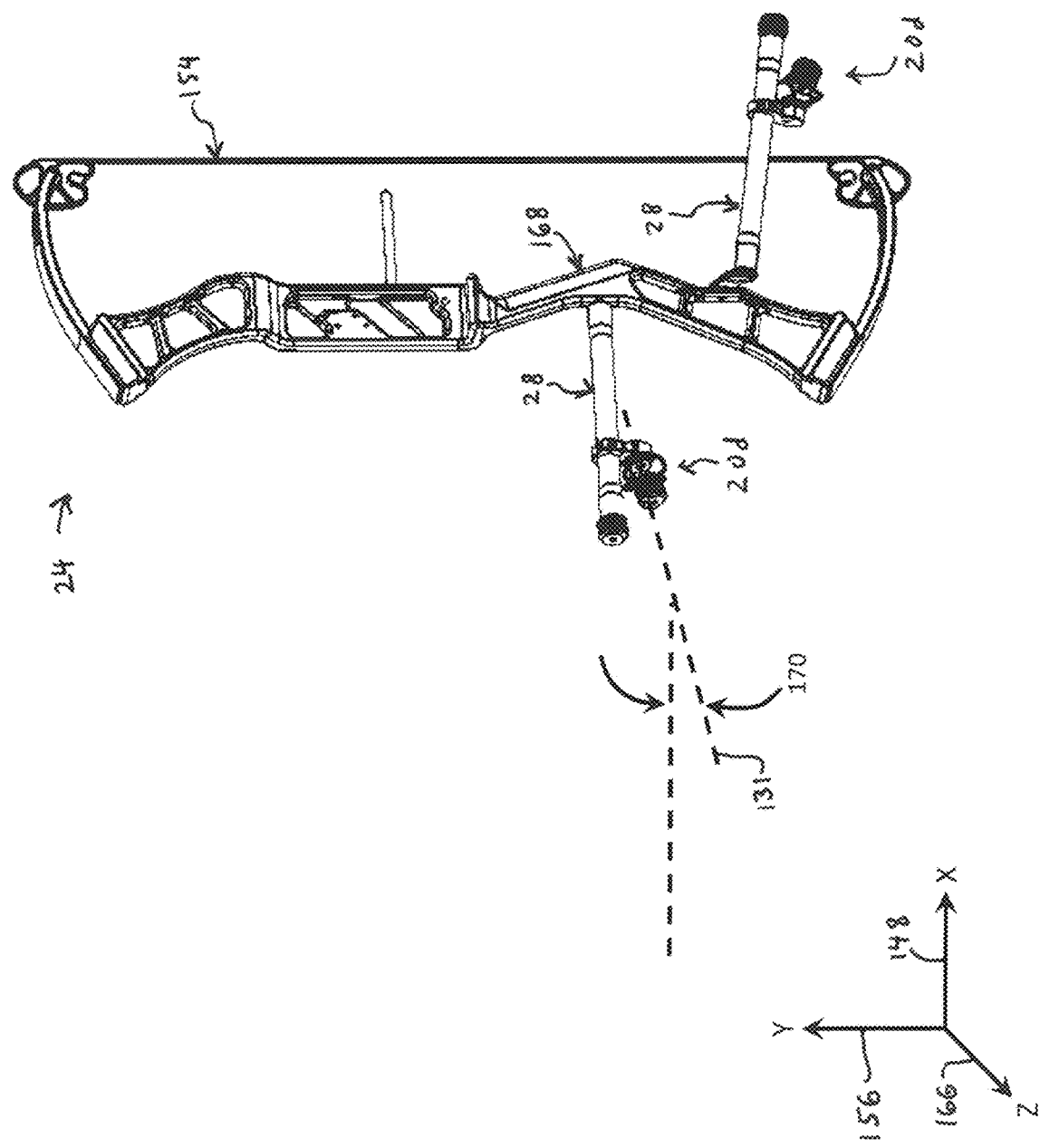
FIG. 9 is an isometric view of the archery bow of FIG. 1B, illustrating the angular position of each of the energy absorbers as mounted to a bow stabilizer.

FIG. 3 illustrates a side view of examples of: (a) an initial shape 150 at a point in time before the shooting equipment 22 receives or generates any forces; (b) an aim response shape 158 caused by the aiming forces imparted by the user to the shooting equipment 22, wherein the aiming forces can act along the X-axis 148, the Y-axis 156, the Z-axis 166 or a combination of such axes; and (c) a shot response shape 164 of the energy absorber 20 caused by a response to the shot forces generated by the shooting equipment 22, wherein the shot forces can act along the X-axis 148, the Y-axis 156, the Z-axis 166 or a combination of such axes. As illustrated in FIG. 3, the energy absorber 20 assumed the aim response shape 158, a compressed state, to absorb the shot force acting outward along the X-axis 148 toward the target (not shown). In the context of the archery bow 24, such compression decreases the extent to which the archery bow 24 is urged to "jump" out of the user's hand toward the target, providing an important advantage to the user. FIG. 4 illustrates a front view of such examples, FIG. 5 illustrates a different side view of such examples, FIG. 6 illustrates a front isometric view of such examples, FIG. 7 illustrates another side view of such examples, and FIG. 8 illustrates yet another side view of such examples.

Figure 5:
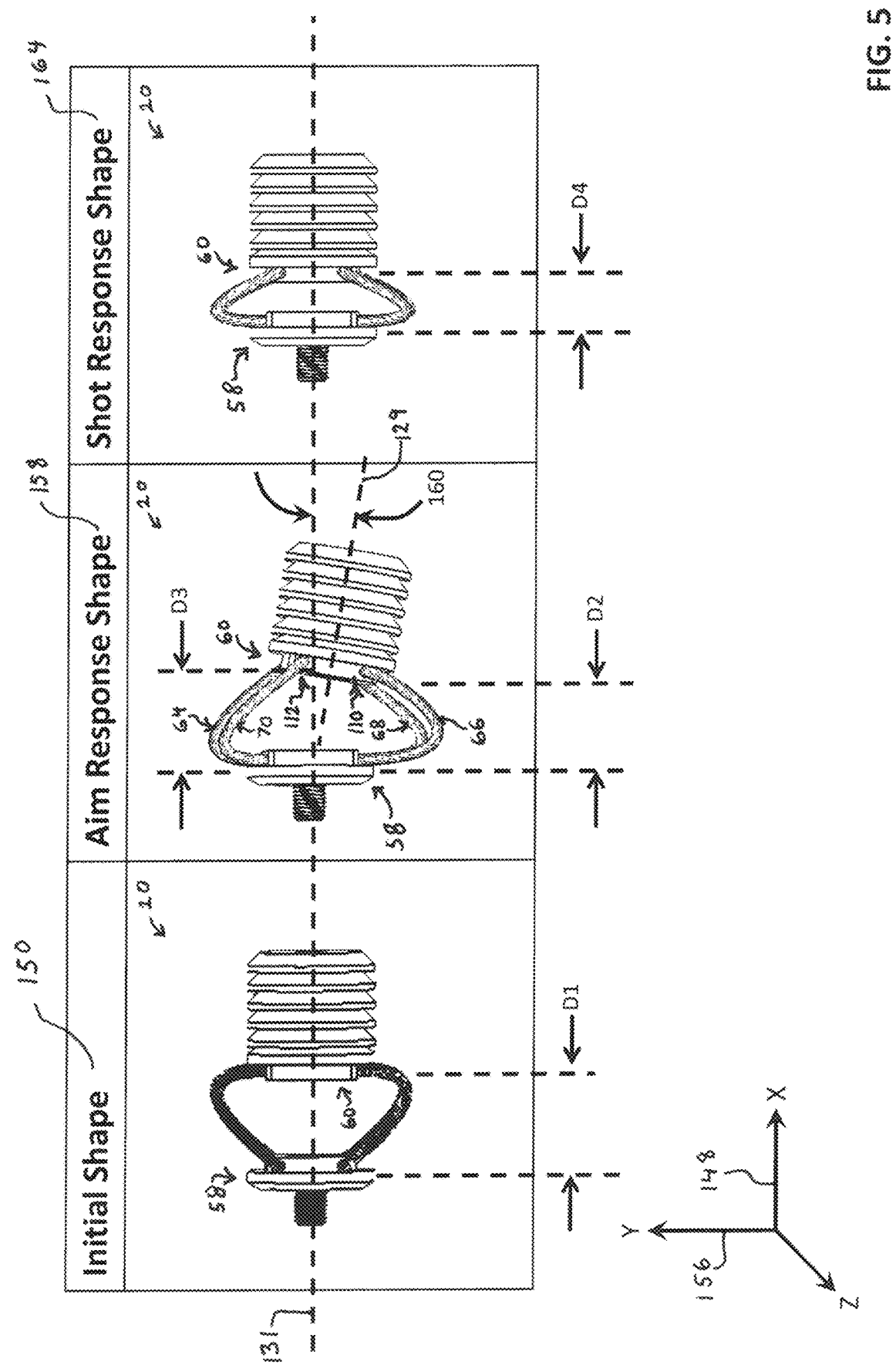
FIG. 5 is a schematic diagram showing side views of examples of the variable shapes of the energy absorber of FIG. 2B, illustrating spatial variations between the base and support as well as angular variations of the weighted object.
Figure 6:
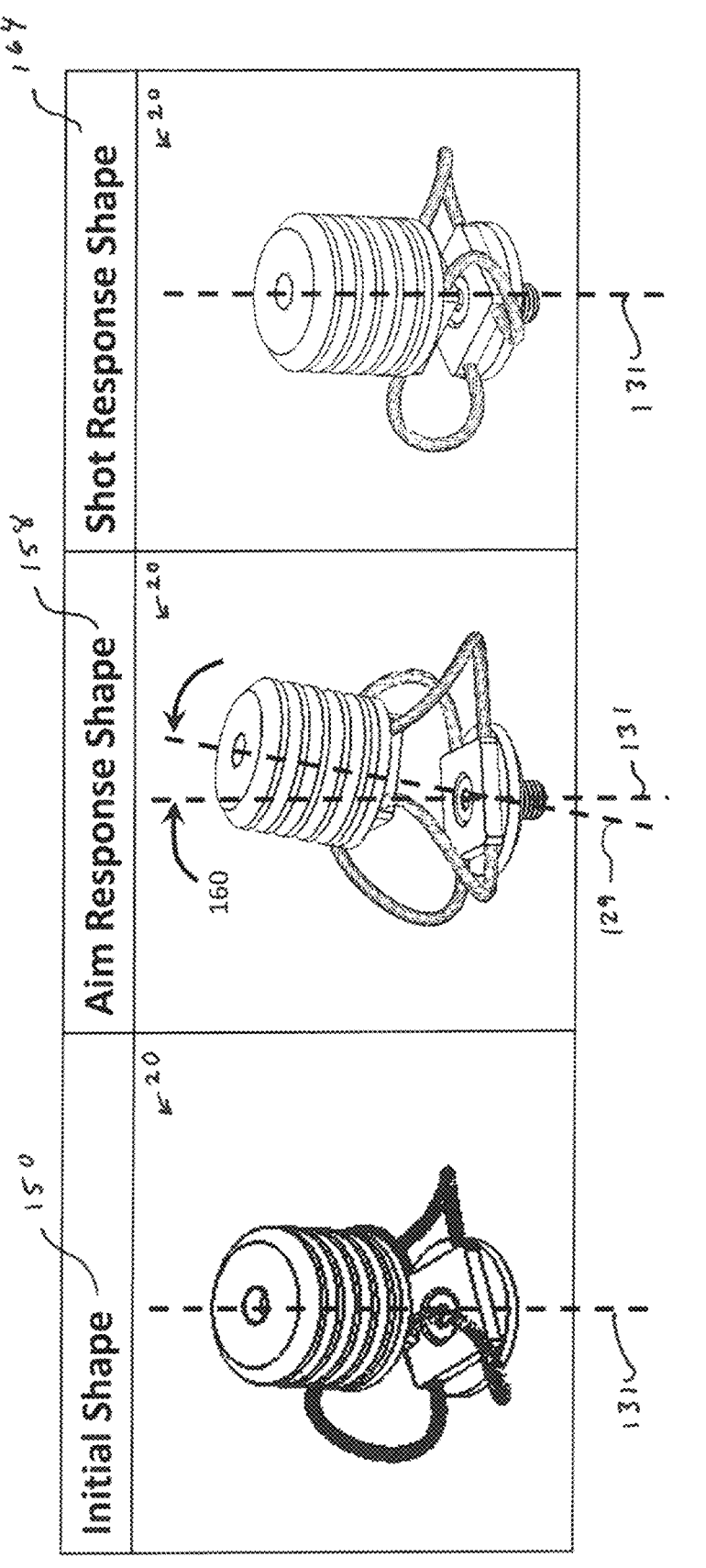
FIG. 6 is a schematic diagram showing side views of examples of the variable shapes of the energy absorber of FIG. 2B, illustrating angular variations of the weighted object.

In these examples illustrated in FIGS. 3-8, the energy absorber 20 has an initial shape 150 such that the longitudinal support axis 129 (FIG. 2A) is collinear with the longitudinal base axis 128 (FIG. 2A), each of which extend along the initial axis 131. In the examples shown, the initial axis 131 is parallel or substantially parallel to the horizontal X-axis 148. This is because of the strength or stiffness of each of the cord segments 68, 70, 72, 74. In the examples shown, the shooting equipment coupler 56 is horizontally oriented so that the longitudinal base axis 128 is parallel to X-axis 148. In such orientation, the weight of the weighted object 62 acts downward along Y-axis 156. Despite this downward-acting weight, the stiffness of each of the cord segments 68, 70, 72, 74 prevents or inhibits the longitudinal support axis 129 of the weighted object 62 from substantially moving below the longitudinal base axis 128 during the aiming period. Therefore, in these examples, the longitudinal support axis 129 remains substantially collinear with the longitudinal base axis 128, each of which extend along the initial axis 131, and the initial axis 131 remains parallel or substantially parallel to the horizontal X-axis 148. As shown in FIG. 5, the support 60 has a distance D1 from the base 58 when the energy absorber 20 is in the initial shape 150.

The energy absorber 20 has this initial shape 150 at the beginning of the aiming period before the shooting occurs. As shown, each one of the cord segments 68, 70, 72, 74 has an initial loop shape or initial arc shape 152, which has an initial radius. Also, at the beginning of the aiming period, the cord segments 68, 70, 72, 74 have a symmetric geometry relative to the initial axis 131 as illustrated in FIG. 4.

During the aiming period, the user attempts to point the shooting equipment 22 (e.g., bow 24 or firearm 26) at a target, such as an animal or a bullseye on a target sheet. As described above, for various reasons, the user might unintentionally or uncontrollably move the shooting equipment 22 when trying to hold the shooting equipment 22 stationary. One cause for this is the weight of the shooting equipment 22 relative to the user's strength. When aiming, the user must hold the shooting equipment 22 away from the user's body for a period of time. The user's arms can quickly tire. The tiring can be worse for a bow 24. With the bow 24, the user must continuously pull on the bowstring or drawcord 154 (FIG. 1B) during the aiming period. Therefore, while aiming, the fatigued muscles can twitch or pulsate, and the user's arms and hands can shake or tremor. This tremor, twitching, pulsation and shaking can generate a plurality of aiming forces, and these aiming forces cause vibration (and vibrational energy) in the shooting equipment 22. Depending upon the strength of the user, the length of the aiming period and the weight of the shooting equipment 22, the magnitude of the aiming forces and vibration can be relatively high. This relatively high vibrational energy in the bow 24 can impede the user's ability to timely achieve and retain an aiming position for shooting a target.

During the aiming period, the energy absorber 20 dampens or otherwise absorbs part, all or a substantial portion of these vibrations transmitted throughout the shooting equipment 20. In the example shown in FIG. 3, during the aiming period, the energy absorber 20 transitions from the initial shape 150 to a plurality of different aim response shapes, such as the aim response shape 158. Each aim response shape includes a variation or modification of the initial shape 150. As shown in FIGS. 3, 5, 7 and 8, in the aim response shape 158, the weighted object 62 has moved relative to the base 58 such that: (a) the longitudinal support axis 129 is angled downward from the initial axis 131 at an angle 160; (b) the support portion 110 has a distance D2 from the base 58; (d) the support portion 112 has a distance D3 from the base 58, which is greater than distance D2; and (e) the cord segments 66, 68 have a different shape than the cord segments 70, 74; and (f) the cord segments 64, 66, 68, 70 are no longer symmetrically arranged about the initial axis 131.

The aiming period ends when the user performs a shooting action. The shooting action causes the shooting equipment 22 to launch a projectile toward a target. For example, a bow shooting action includes the user's release of the drawcord 154 (FIG. 1B), and a firearm shooting action includes the user's pulling of the trigger 162 (FIG. 1C). As described above, the launching of the projectile (e.g., arrow or bullet) causes problematic vibrations to oscillate in the shooting equipment 22. The energy absorber 20 dampens or otherwise absorbs part, all or a substantial portion of these vibrations transmitted throughout the shooting equipment 20. In the example shown in FIGS. 3-8, after the aiming period, the energy absorber 20 transitions from the initial shape 150 to a plurality of different shot response shapes, such as the shot response shape 164. Each shot response shape includes a variation or modification of the initial shape 150 or the aim response shape 158.

The vibrations caused by the projectile launch can be substantially greater than the vibrations caused by the user during the aiming period. Therefore, as shown in FIGS. 3-8, the energy absorber 20 can undergo a substantial amount of compression. As shown in FIG. 5, in the shot response shape 164, the weighted object 62 has moved relative to the base 58 such that: (a) the support 60, including its support surface 105 (FIG. 2A), has a distance D4 from the base 58, which is less than the distance D2 of the aim response shape 158 and less than the distance D1 of the initial shape 150; (b) the cord segments 64, 66, 68, 70 have the same shape; and (c) the cord segments 64, 66, 68, 70 remain symmetrically arranged about the initial axis 131. In this example, the cord segments 64, 66, 68, 70 have this same shape and symmetry based on the condition that the vibrational force is applied to the energy absorber 20 directly along the initial axis 131. When this is not the case, the cord segments 64, 66, 68, 70 will transition to different shapes and asymmetry.

It should be understood that the vibrations oscillate through the shooting equipment 22 at a consistent frequency or variable frequency based on the vibrations generated by the user. The energy absorber 20 dampens or absorbs all or a substantial portion of the vibrations to modify the response of the shooting equipment 22. For example, the weighted object 62 is configured to oscillate during and after the aiming period. During the oscillation of the weighted object 62, the cord segments 68, 70, 72, 74 deform while elastically urging to return to the initial shape 150. This is because the cord segments 68, 70, 72, 74 are predisposed to return to the initial shape 150 after the points in time at which the aiming forces and shot forces occur. The deformation of the cord segments 64, 66, 68, 70 absorbs the vibrational energy of the shooting equipment 22. Also, this energy absorption alters the natural frequency of vibration of the shooting equipment 22 to avoid (or reduce the risk of) the shooting equipment 22 reaching the point of mechanical resonance, an event that would generate relatively high shaking of the shooting equipment 22.

It should be appreciated that the aim response shape 158 shown in FIGS. 3-8 is only one example of the many different types of aim response shapes of the energy absorber 20. Likewise, the shot response shape 164 shown in FIGS. 3-8 is only one example of the many different types of shot response shapes of the energy absorber 20. Furthermore, it should be appreciated that, during the aiming period, the energy absorber 20 can move great enough to assume the same shape as a shot response shape. For example, if the user's muscle tremor is great enough, the energy absorber 20 could substantially compress to reach a shape such as shot response shape 164. In addition, it should be appreciated that, after the aiming period, the energy absorber 20 can move off the initial axis 131 to assume an asymmetric shape that is the same as an aim response shape. For example, the angle of the counteractive projectile force (or the user's holding forces) can cause the energy absorber 20 to tilt or lean to reach a shape such as the aim response shape 158.

Referring back to FIG. 1A, in operation of an example, the weighted object 62 is configured to oscillate within at least six degrees of freedom during and after the aiming period, including: (a) lateral inward movement along the Z-axis 166; (b) lateral outward movement along the Z-axis 166; (c) upward movement along the Y-axis 156; (d) downward movement along the Y-axis 156; (e) forward movement along the X-axis 148; and (f) rearward movement along the X-axis 148. The oscillation action of the weighted object 62 can include a plurality of different oscillation motions, including an inward-outward oscillation, upward-downward oscillation, forward-rearward oscillation or any combination of such oscillation actions, including, but not limited to: (i) a twisting motion in which the support 60 twists or rotates relative to the base 58; (ii) a tilting motion in which the plane in which the support 60 lies intersects with the plane in which the base 58 lies; (iii) a wobbling motion of the weighted object 62, a bobbing motion of the weighted object 62, a roll motion of the weighted object 62, a yaw motion of the weighted object 62 or a pitch motion of the weighted object 62; or (iv) a combination of the foregoing. This freedom of movement of the weighted object 62 relative to the base 58 provides a substantial improvement over the prior art damper described above. For example, these degrees of freedom enable the energy absorber 20 to absorb higher amounts of energy than the prior art damper.

As illustrated in FIGS. 9-12, in an embodiment, the energy absorber 20d is configured to be adjustably coupled to the bow stabilizer 28. In the example shown, the bow 24 has two bow stabilizers 28 screwed into the riser 168 of the bow 24. Depending upon the embodiment, the bow stabilizer 28 can include a rigid or semi-rigid rod having or incorporating a vibration dampener element or material, such as synthetic or natural rubber. The bow stabilizer coupler 54 is configured to orient the initial axis 131 at a downward angle 170 relative to the X-axis 148.

Figure 10:
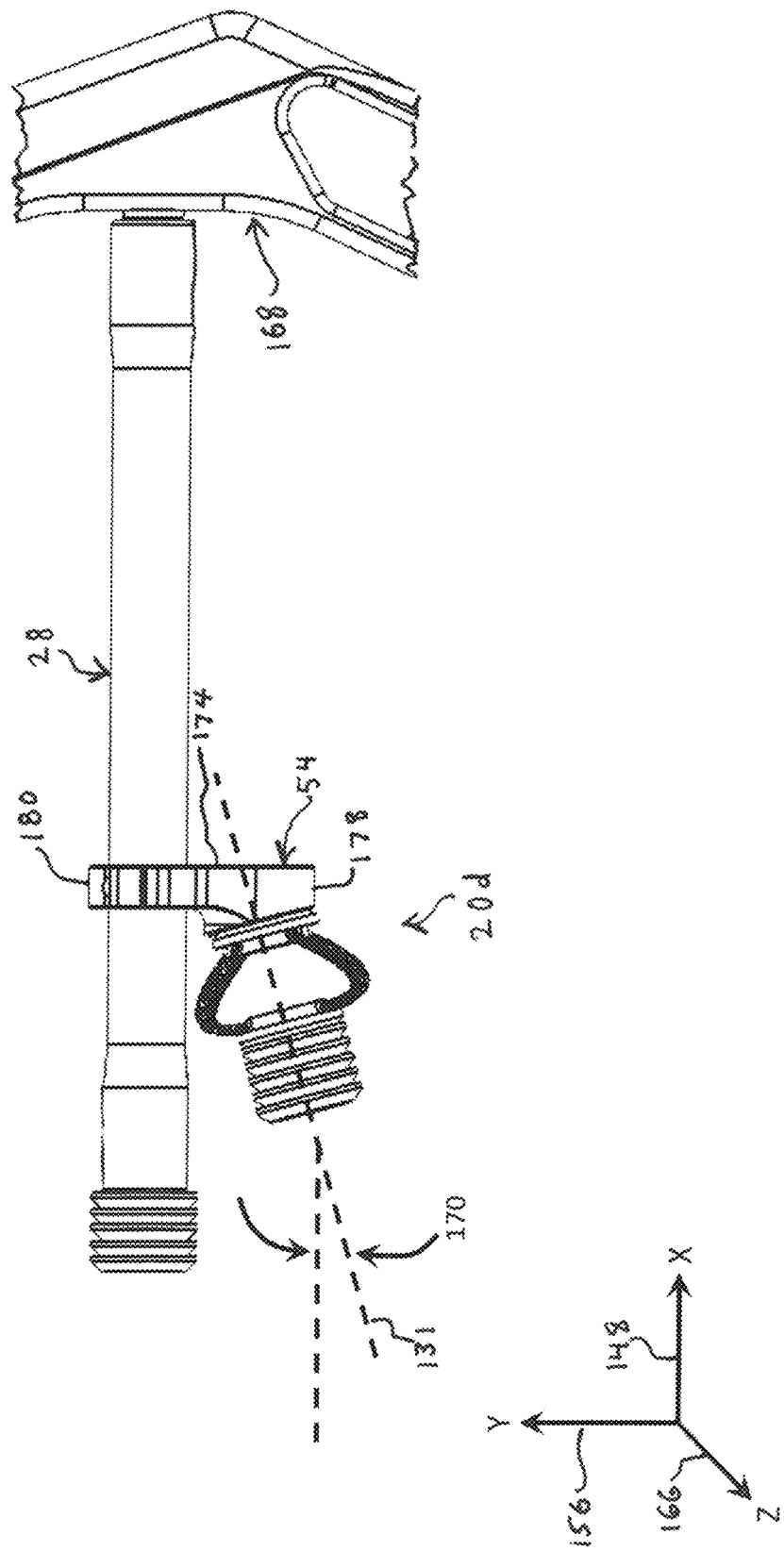
FIG. 10 is an enlarged, side view of a forward-facing energy absorber of FIG. 9.
Figure 11:
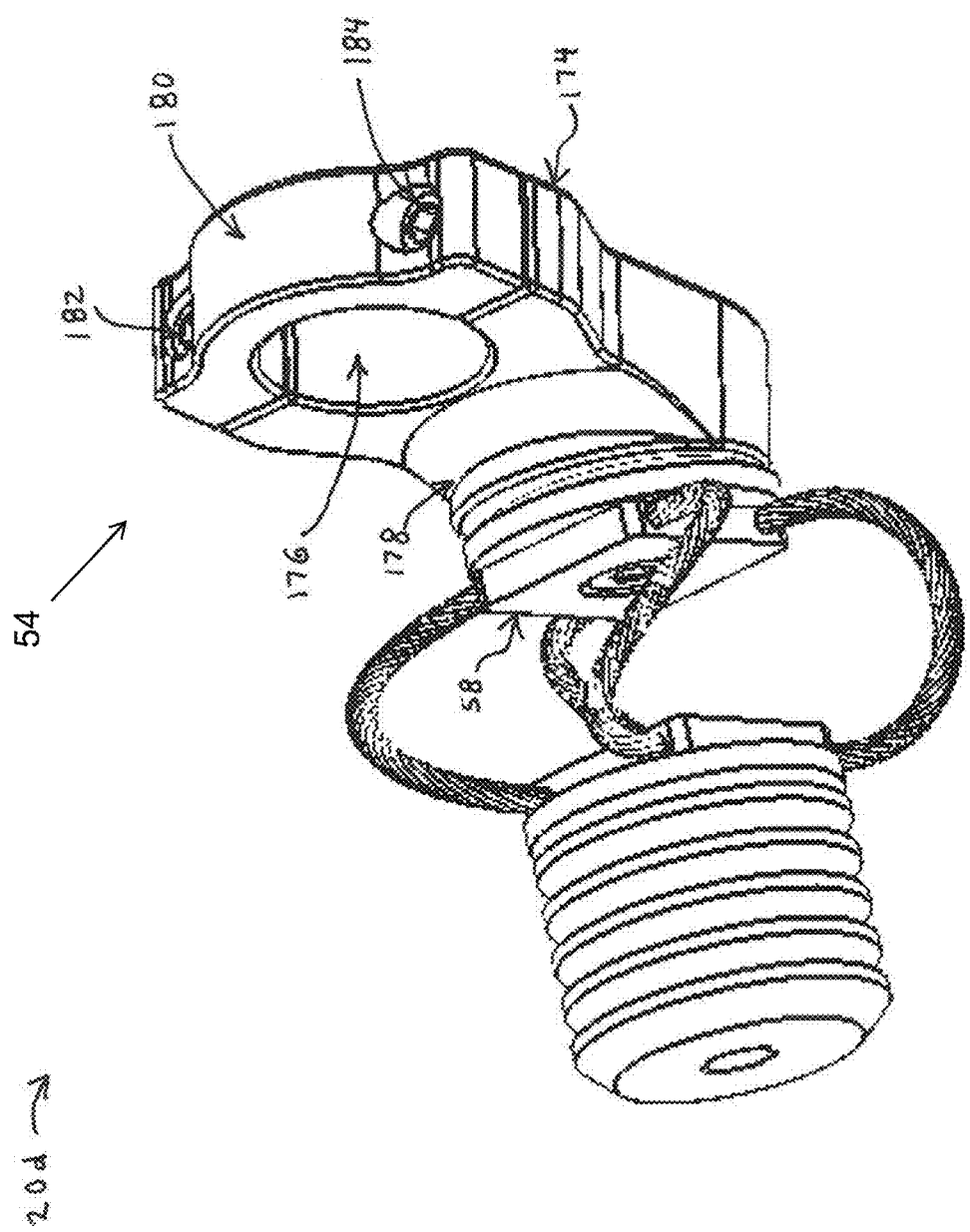
FIG. 11 is an enlarged, isometric view of the forward-facing energy absorber of FIG. 10, illustrating an embodiment of a bow stabilizer coupler.

As shown in FIGS. 10-11, the bow stabilizer coupler 54 includes: (a) a body 174 defining part of a coupler passageway 176; (b) a mount 178 connected to the body 174; and (c) a retainer 180 defining another part of the coupler passageway 176. The mount 178 defines a threaded channel (not shown) configured to threadingly engage with the shooting equipment coupler 56. In this way, the base 58 is securable to the mount 178. Also, the body 174 defines a plurality of threaded channels (not shown), and the retainer 180 defines a plurality of fastener channels (not shown). To install the energy absorber 20d onto the bow stabilizer 28, the user can: (a) remove the retainer 180 from the body 174; (b) hold the body 174 against the bow stabilizer 28 so that a lower portion of the bow stabilizer 28 fits within part of the coupler passageway 176; (c) place the retainer 180 onto the upper portion of the bow stabilizer 28; (d) insert a first fastener 182 through one of the fastener channels and into one of the threaded channels of the body 174; (e) insert a second fastener 184 through the other fastener channel and into the other threaded channel of the body 174; and (f) rotate the fasteners 182, 184 until the retainer 180 and body 174 securely sandwich and compress the bow stabilizer 28. This configuration and method enables the user to install and uninstall the energy absorber 20d without having to remove the bow stabilizer 28 from the bow 24.

It should be appreciated that the distance of the of the energy absorber 20d from the riser 168 of the bow 24 can affect the dampening or energy absorption function of the energy absorber 20d. As illustrated in FIG. 12, by partially untightening fasteners 182, 184, the user can slide the energy absorber 20d from a position at a distance D5 from the riser 168 to a position at a distance D6 from the riser 168. Doing so can alter the mechanical resonance of the bow stabilizer 28 or the bow 24. The user can therefore fine tune and micro-adjust the vibrational dampening function by adjusting the position of the energy absorber 20d along the bow stabilizer 28.

Figure 13A:
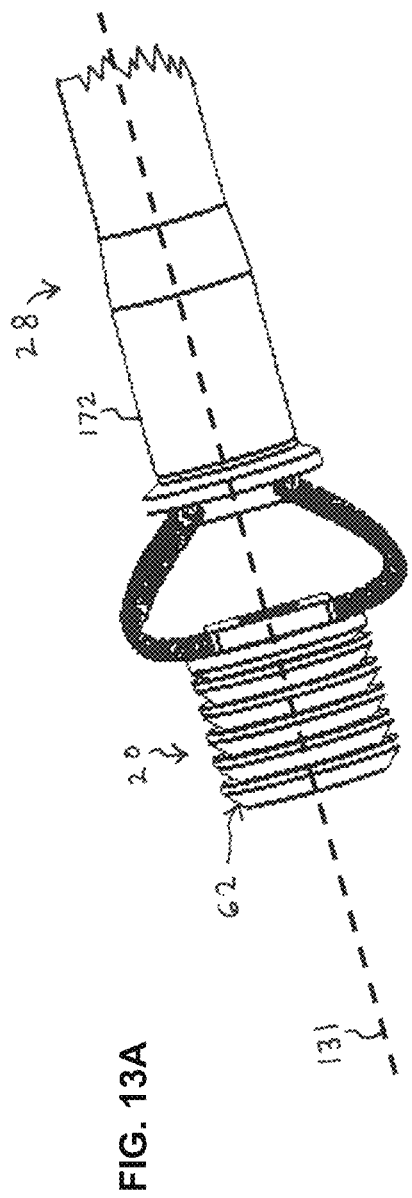
FIG. 13A is an enlarged, isometric view of the forward-facing energy absorber of FIG. 10, illustrating an initial position of the energy absorber while directed at an angle relative to an X-axis.
Figure 13B:
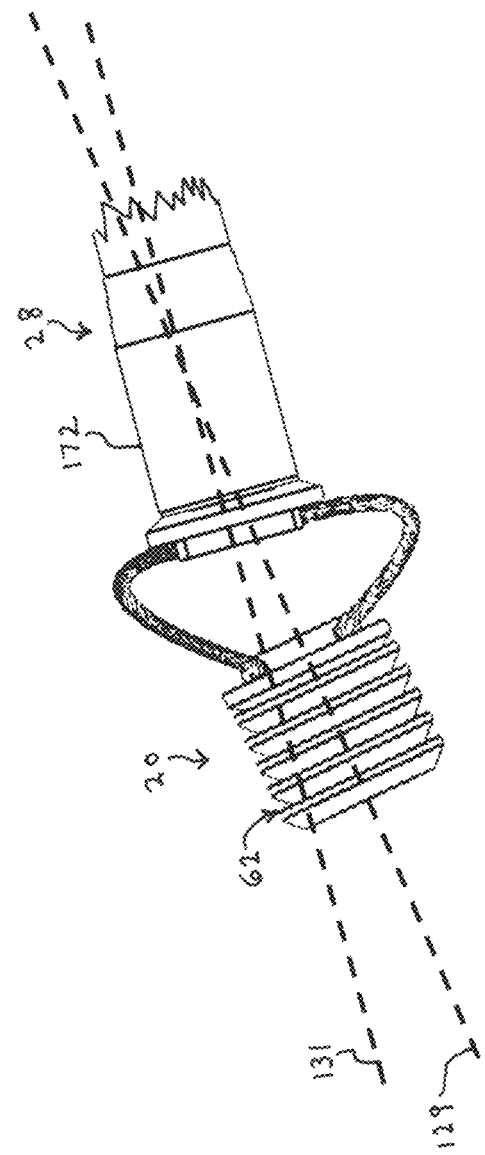
FIG. 13B is an enlarged, isometric view of the forward-facing energy absorber of FIG. 13A, illustrating a second position of the energy absorber while directed at a different angle relative to an X-axis.
Figure 14A:
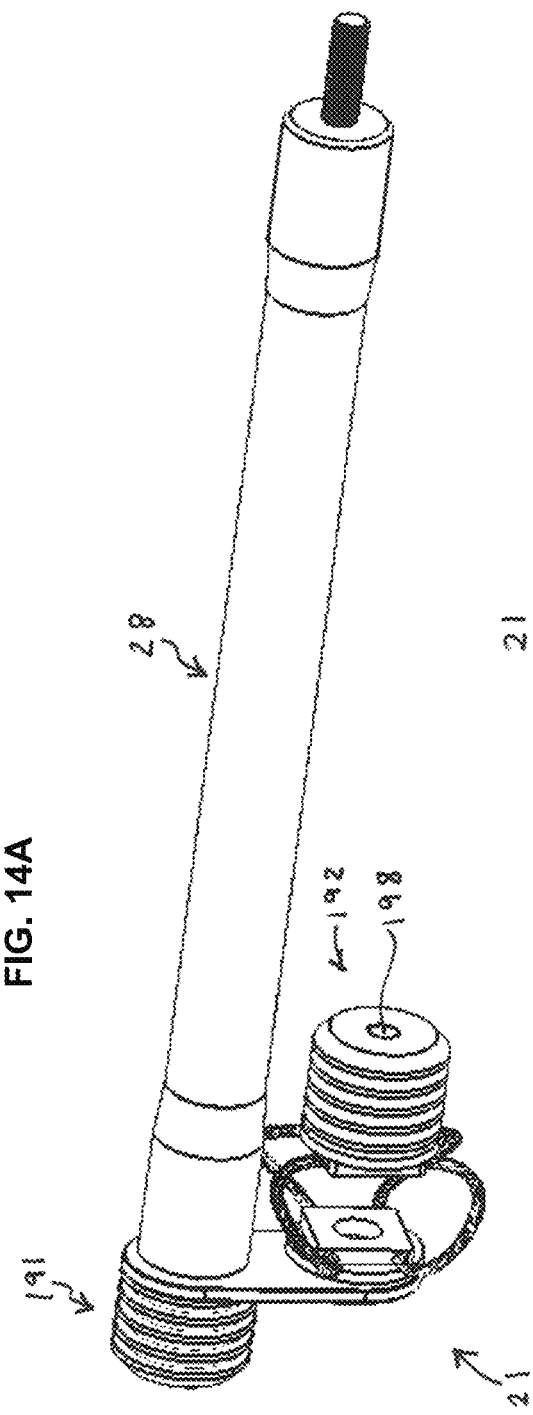
FIG. 14A is an isometric view of an embodiment of an energy absorber assembly having a plurality of energy absorbers, facing in opposite directions, that are coupled to a bow stabilizer.
Figure 14B:
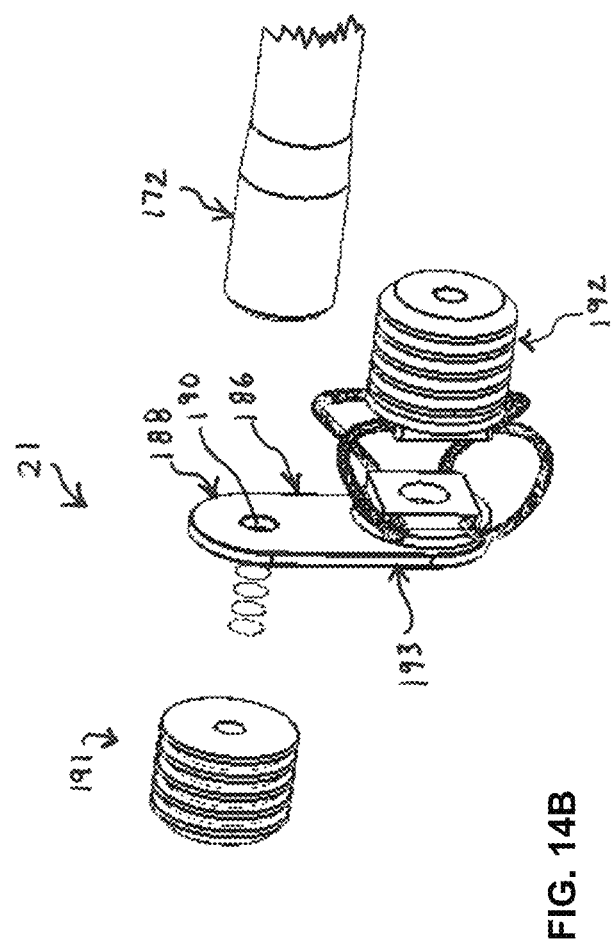
FIG. 14B is an exploded, isometric view of the energy absorber assembly of FIG. 14A.

As illustrated in FIGS. 13A-13B, in an embodiment, the energy absorber 20 is screwed directly into the stabilizer end 172 of the bow stabilizer 28. At the start of the aiming period, the weighted object 62 is centered along the initial axis 131. During and after the aiming period, the weighted object 62 is configured to reposition or move so that the longitudinal support axis 129 is no longer collinear with the initial axis 131.

As illustrated in FIGS. 14A-15B, in an embodiment, the energy absorber assembly 21 includes: (a) a body 186; (b) an upper mount 188 connected to the body 186 and defining an upper fastener passageway 190; (b) an upper weighted object 191 coupled or mounted to the upper mount 188; (c) a lower mount 193 connected to the body 186 and defining a lower fastener passageway 194; and (d) a lower weighted object 192 coupled or mounted to the lower mount 193. In this embodiment, each one of the weighted objects 191, 192 has the same structure, elements, components and functionality as the weighted object 62 described above except that the object channel 198 defined by the weighted object 191 is a non-threaded, pilot hole. The shooting equipment coupler 56 (illustrated via dotted line) is configured to connect the base 58 to the lower mount 193. To attach the energy absorber assembly 21 to the bow stabilizer 28, the user can insert a screw or other threaded fastener 201 (illustrated via dotted line) through the object channel 198 defined by the weighted object 191. The user can then rotate the fastener 201 within the threaded channel 200 of the stabilizer end 172 to threadingly secure the weighted object 191 to the stabilizer end 172. As a result, the entire energy absorber assembly 21 will be secured to the stabilizer end 172 as shown in FIGS. 14A-15B.

Figure 17:
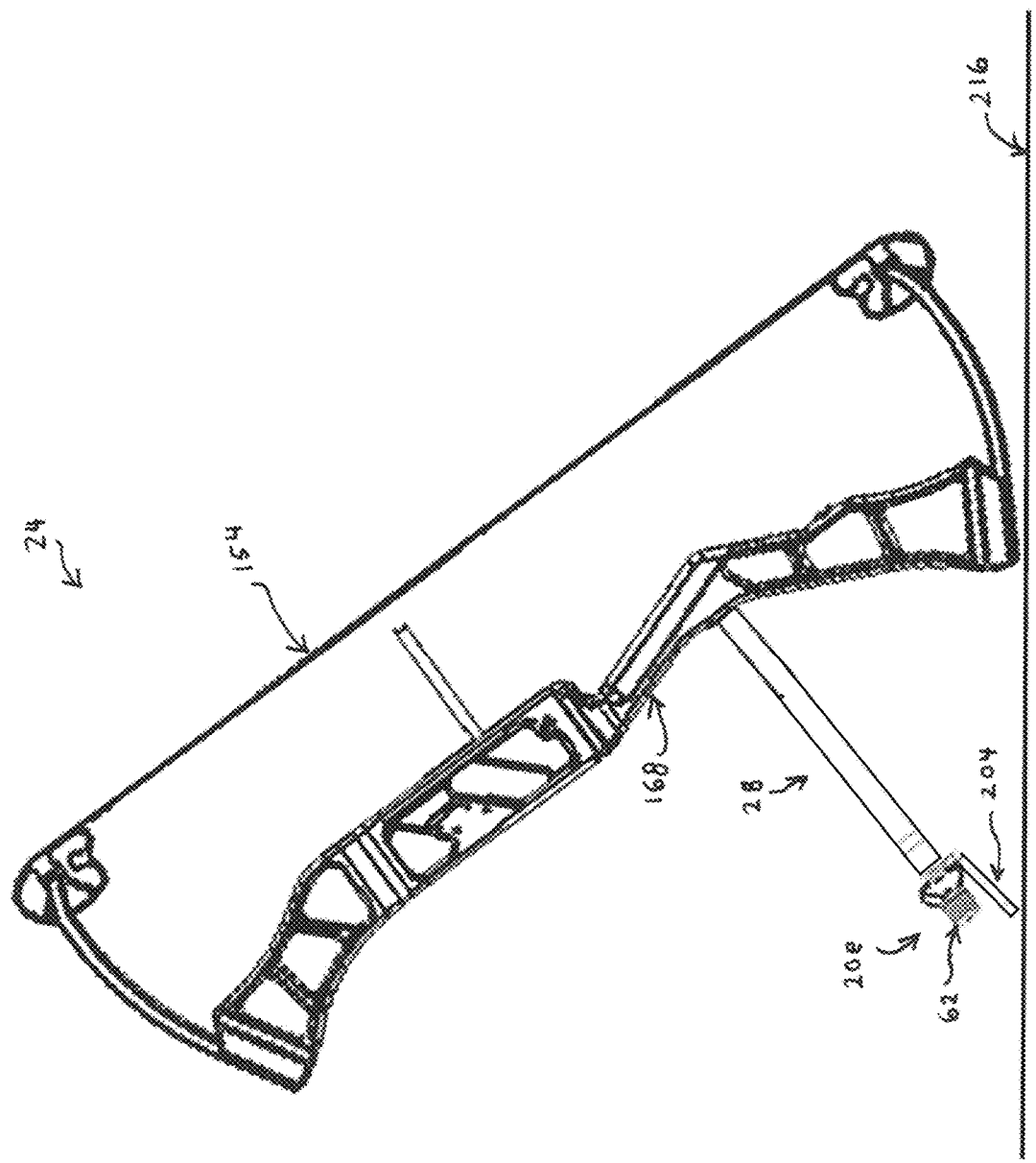
FIG. 17 is an isometric view of an embodiment of an archery bow having the energy absorber of FIG. 16A attached to the bow stabilizer, illustrating the guard making contact with the ground or support surface.

In another embodiment illustrated in FIGS. 16A-17, the energy absorber 20e includes: (a) a body 202; (b) an energy absorber 20 coupled or mounted to the body 202; and (c) a protector or guard 204 coupled to, and extending from, the body 202. The guard 204 has an elongated shape and length that the distal guard end 206 is located beyond, and forward of, the object end 208 of the weighted object 62. The distal guard end 206 also includes a cap or boot 214 configured to cover the distal guard end 206. The boot 214 can be resilient and constructed of a suitable material having a friction enhancer.

In an embodiment, the object coupler 63 (FIG. 2A) secures the weighted object 62 to the support 60, and another fastener (e.g., a threaded bolt or screw) fits through the body opening 210 and secures the body 202 to the stabilizer end 172 of the bow stabilizer 28. In an embodiment, the proximal guard end 212 is threaded. The user can install the guard 204 by inserting the proximal guard end 212 into a threaded channel (not shown) defined by the body 202, and then rotating the proximal guard end 212 until the guard 204 fits tightly and securely onto the body 202.

Referring to FIG. 17, the guard 204 is configured and operable to protect and safeguard the weighted object 62 and other components of the energy absorber 20e from physical interaction with the ground, trees, people, vehicle interiors and other objects. For example, it is common for users to place a bow 24 on the ground or other support surface 216, sometimes using the bow stabilizer 28 as a kickstand. In that scenario, the guard 204 prevents the support surface 216 from contacting the weighted object 62, as shown. This prevents the forces and impact of the support surface 216 from depressing the weighted object 62, deforming the cord segments 64, 66, 68, 70 and damaging the energy absorber 20e.

Referring back to FIG. 5, in an embodiment, the user can vary the distance D1 between the base 58 and the support 60. For example, the energy absorber 20 can include a cord adjuster (not shown) operable to adjust the lengths of the cord segments 64, 66, 68, 70. Alternatively, the energy absorber 20 can include a kit of various sets of cord segments 64, 66, 68, 70. Each cord set can be associated with a different cord length so that, for example, cord set X is configured to provide a distance X1 between the base 58 and the support 60, cord set Y is configured to provide a distance Y1 between the base 58 and the support 60, and cord set Z is configured to provide a distance Z1 between the base 58 and the support 60. An increase in the distance between the base 58 and the support 60 increases the leverage and responsiveness or sensitivity of the energy absorber 20. In contrast, a decrease in the distance between the base 58 and the support 60 causes an increase in the stiffness of the energy absorber 20. By varying this distance, the user can achieve a desired frequency for the absorption of vibrational energy. For example, cord set X can be associated with a low frequency range, cord set Y can be associated with a medium frequency range, and cord set Z can be associated with a high frequency range.

As described above, the degrees of freedom of the weighted object 62 and the other functions of the energy absorber 20 provide a substantial improvement in performance compared to the prior art damper. For example, the energy absorber 20 provides a significant improvement in shooting accuracy by decreasing the variation in movement and vibration during the aiming action and shooting action of using the shooting equipment 22. This decrease in variation and influence on the projectile (e.g., the arrow or ammunition round) corresponds to an increase in shooting accuracy.

Referring to FIGS. 17A-17G, in an embodiment, the energy absorber 20f has the same structure, elements, components and functionality as the energy absorber 20 except that the energy absorber 20f includes a base adjuster 310. The base adjuster 310 is operable to adjust the angular position of the base 58 relative to a mount portion 312 that is fixedly connected to the shooting equipment 22. Depending upon the embodiment, the mount portion 312 can be the portion of the shooting equipment 22 to which the energy absorber 20f is directly mounted or a mount 314 of the energy absorber 20f.

In the example shown, the energy absorber 20f is coupled to the archery bow 24. Some of the shot forces 322 of the archer bow 24 act laterally or side-to-side along the Z-axis 166. In the example shown in FIGS. 17A-17E, the energy absorber 20f is screwed into the stabilizer end 316 of the bow stabilizer 28 of the archer bow 24. In this case, the stabilizer end 316 serves as the mount portion 312 described above. The base adjuster 310 includes: (a) the shooting equipment coupler 56; (b) at least one designated base point 318 on the base 58; and (c) at least one designated mount point 320 on the stabilizer end 316. The base adjuster 310 enables the user to fine tune the energy absorber 20f by adjusting the angular position of the designated base point 318 relative to the designated mount point 320.

In the example shown in FIGS. 17B and 17D (which shows a top view of the energy absorber 200, the user, before fully tightening the coupler 56, adjusted the position of the designated base point 318 to be ninety degrees apart from the designated mount point 320. Then, the user tightened the coupler 56. This results in a first lateral resistance position 324 corresponding to a relatively low lateral resistance to the post shooting forces 322. This is because the stems 326, 328, 330, 332 of the cord segments 64, 66, 68, 70, respectively, extend perpendicular or transverse to the post shooting forces 322. As the forces 322 urge the weighted object 62 to shift laterally along the Z-axis 166, the weighted object 62 causes the stems 326, 328, 330, 332 to rotate, swing, twist or pivot relative to the base 58. This twisting or pivoting facilitates the lateral movement of the weighted object 62, which, in turn, corresponds to a relatively sensitive energy absorption setting.

As shown in FIGS. 17C and 17E (which shows a top view of the energy absorber 200, to change the sensitivity, the user can partially untighten the coupler 56. Then, the user can rotate the designated base point 318 clockwise by ninety degrees until the designated base point 318 is aligned with the designated mount point 320. Next, the user can tighten the coupler 56. It should be appreciated that, although the example shows a ninety degree adjustment, the user can adjust by any desired angle less than or greater than ninety degrees. In this example, the ninety degree adjustment results in a second lateral resistance position 334 corresponding to a relatively high lateral resistance (e.g., stiffness) to the post shooting forces 322. This is because the stems 326, 328, 330, 332 of the cord segments 64, 66, 68, 70, respectively, extend parallel or substantially parallel to the shot forces 322. As the shot forces 322 urge the weighted object 62 to shift laterally along the Z-axis 166, the weighted object 62 applies lateral forces (acting along Z-axis 166) to the stems 326, 328, 330, 332. Because the stems 326, 328, 330, 332 extends along the Z-axis 166, the stems 326, 328, 330, 332 counteract these lateral forces. This counteraction impedes the lateral movement of the weighted object 62, which, in turn, corresponds to an absorption setting having less sensitivity than the first lateral resistance position 324.

In the top views of the energy absorber 20f shown in FIGS. 17F-17G, the first lateral resistance position 324 enables and facilitates the rotation, swinging, twisting, or pivoting of the stems 320, 328 in response to the lateral movement of the weighted object 62 along the Z-axis 166. In contrast, in the second lateral resistance position 334, the stems 326, 332 impede and counteract the lateral movement of the weighted object 62 along the Z-axis 166.

In another embodiment illustrated in FIGS. 17H-17I, the energy absorber 20g has the same structure, elements, components and functionality as the energy absorber 20f. In this embodiment, however, the base adjuster 310 includes a base measurement indicator 336. The base measurement indicator 336 is supported by or otherwise displayed on a cylindrical or tubular surface 338 of the base 58. The base measurement indicator 336 includes a plurality of lines or markers that are equally spaced apart from each other. In an embodiment, unique numbers or symbols are displayed adjacent to the markers. When fine tuning, micro-adjusting or otherwise adjusting the angular position of the base 58 relative to the mount 314, the base measurement indicator 336 provides the user with a visual aid to repeat desired settings and incrementally change the settings for optimization. In operation, the user can partially untighten the coupler 56. Then, the user can grasp the tubular surface 338 and rotate the base 58 clockwise or counterclockwise until aligning the mount indicator 340 with a desired one of the markers of the base measurement indicator 336. Next, the user can tighten the coupler 56 to secure the desired setting. This provides the user with enhanced flexibility and control over the fine tuning settings of the energy absorber 20g.

Figure 18:
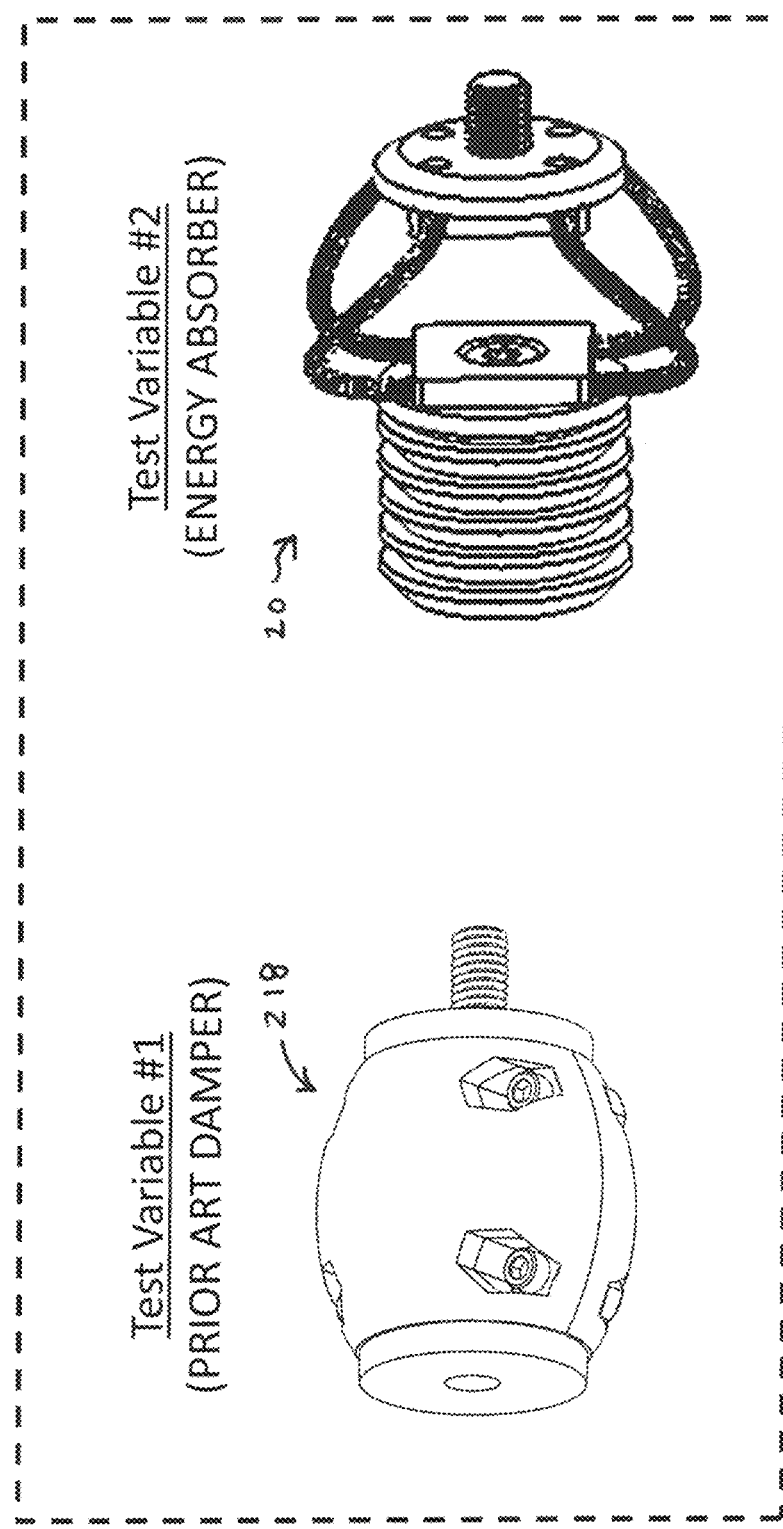
FIG. 18 is a schematic diagram illustrating test variable #1 and test variable #2.

Referring to FIG. 18, several tests have been performed to compare the vibration dampening performance of a prior art damper 218 to the energy absorber 20. The prior art damper 218 is a rubber part having a solid or partially-solid interior.

Figure 19:
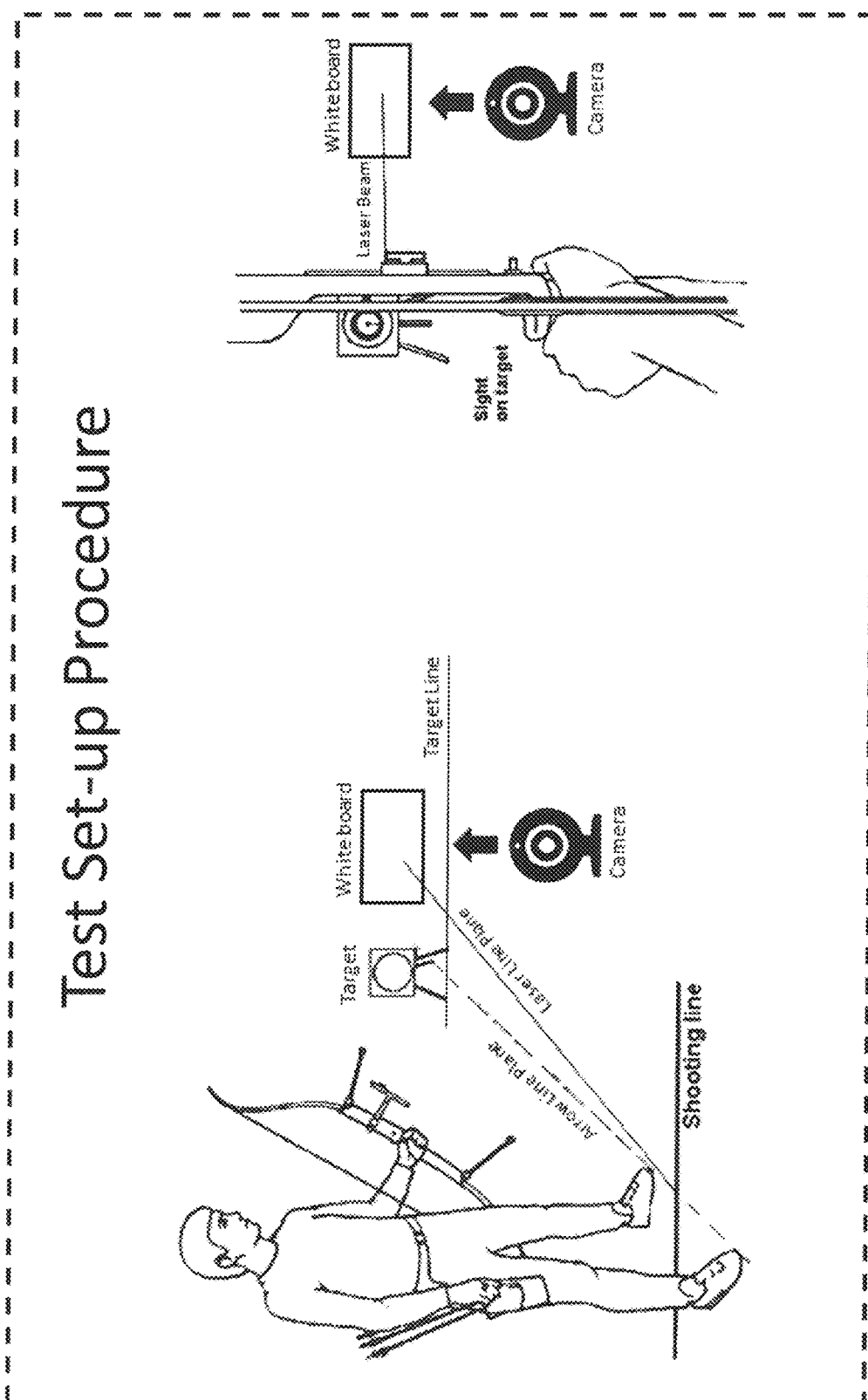
FIG. 19 is a schematic diagram illustrating a test setup procedure.

As illustrated in FIG. 19, the test setup procedures include the following:

(a) An archer (the test subject) stands twenty yards away from the target.

(b) A laser apparatus is attached to the sight device of the archery bow.

(c) The laser apparatus is fixed to the bow so that the laser beam points to a whiteboard a few feet from the target on the target line.

(d) The laser apparatus is also fixed to the bow so that the movement the archer sees during the aiming process is copied and produced on the whiteboard next to the target.

(e) The laser beam of the laser apparatus does not shine on the target.

(f) The laser beam cannot be seen by the archer and is not a distraction.

Figure 20:
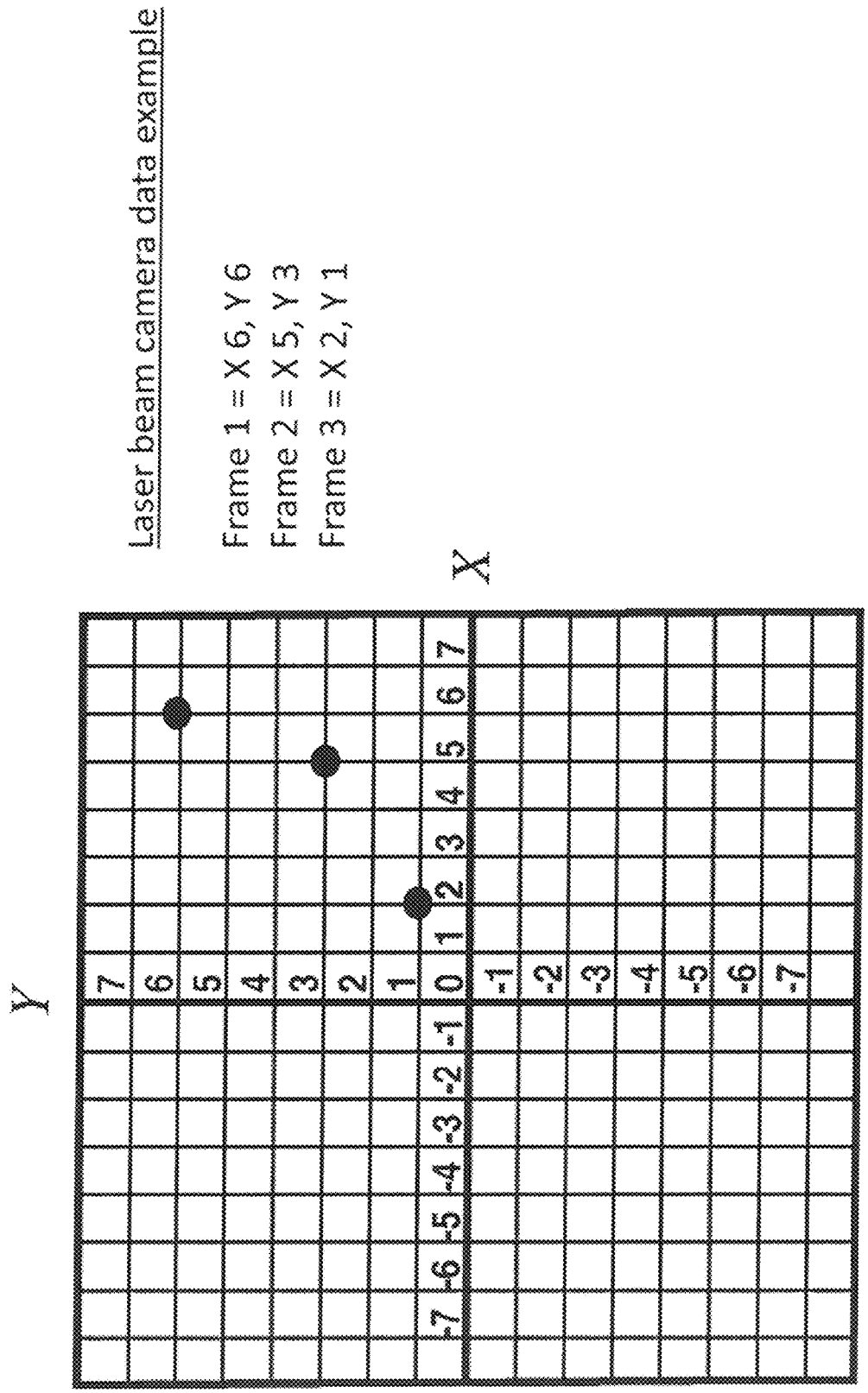
FIG. 20 is a schematic diagram illustrating an example of laser beam camera data.

Referring to FIG. 20, the camera data was analyzed as follows:

(a) The video data was uploaded into analysis software that tracks the laser beam on a cartesian coordinate system.

(b) The constant laser beam is broken into data "points" or dots by the frame rate of the camera.

(c) The camera used had a frame rate of 30 FPS.

(d) Within each second, thirty laser points were generated, and these points created a dot trail throughout the shooting process.

Figure 21:
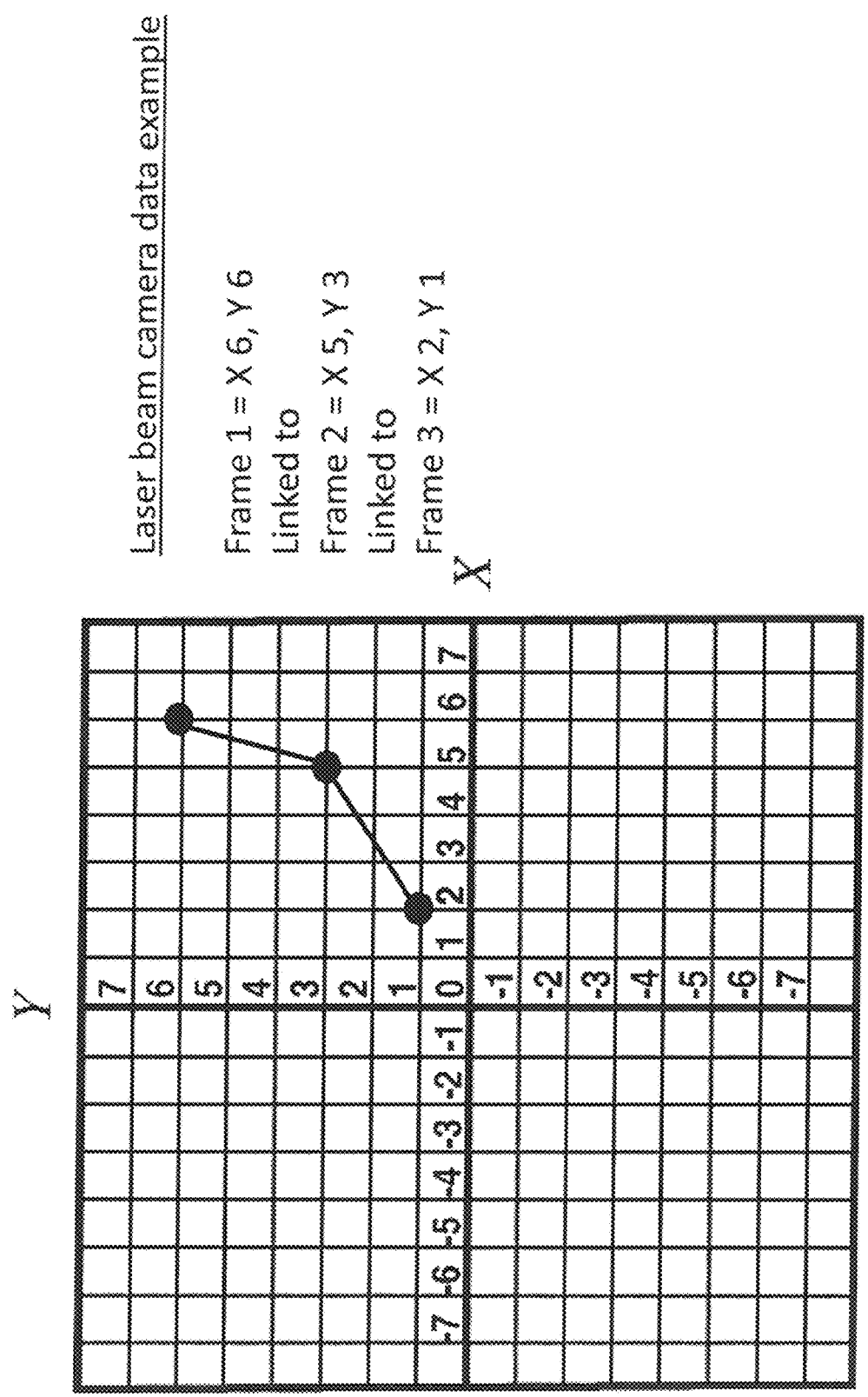
FIG. 21 is a schematic diagram illustrating another example of laser beam camera data.

Referring to FIG. 21, the camera data was analyzed as follows:

(a) The video software linked each frame's laser point with the next following point.

(b) By connecting the points (dots), this formed a trail.

Figure 22:
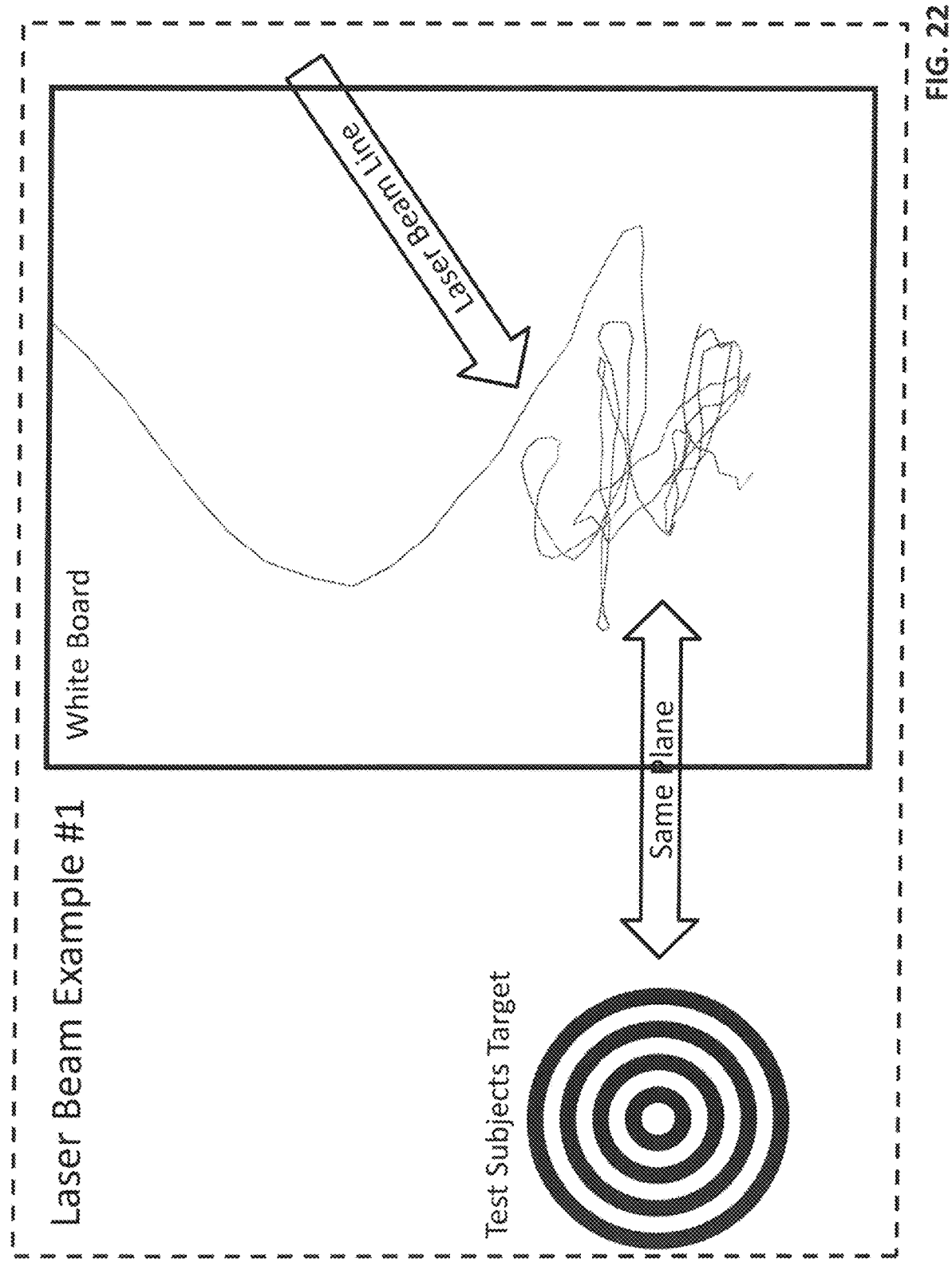
FIG. 22 is a schematic diagram illustrating a laser beam example #1.

Referring to FIG. 22, the laser beam line is displayed on the whiteboard in a first trial. The length of the entire laser line from start to finish was used for data collection. The greater the movement or more direction changes of the laser line, represents a longer laser line.

Figure 23:
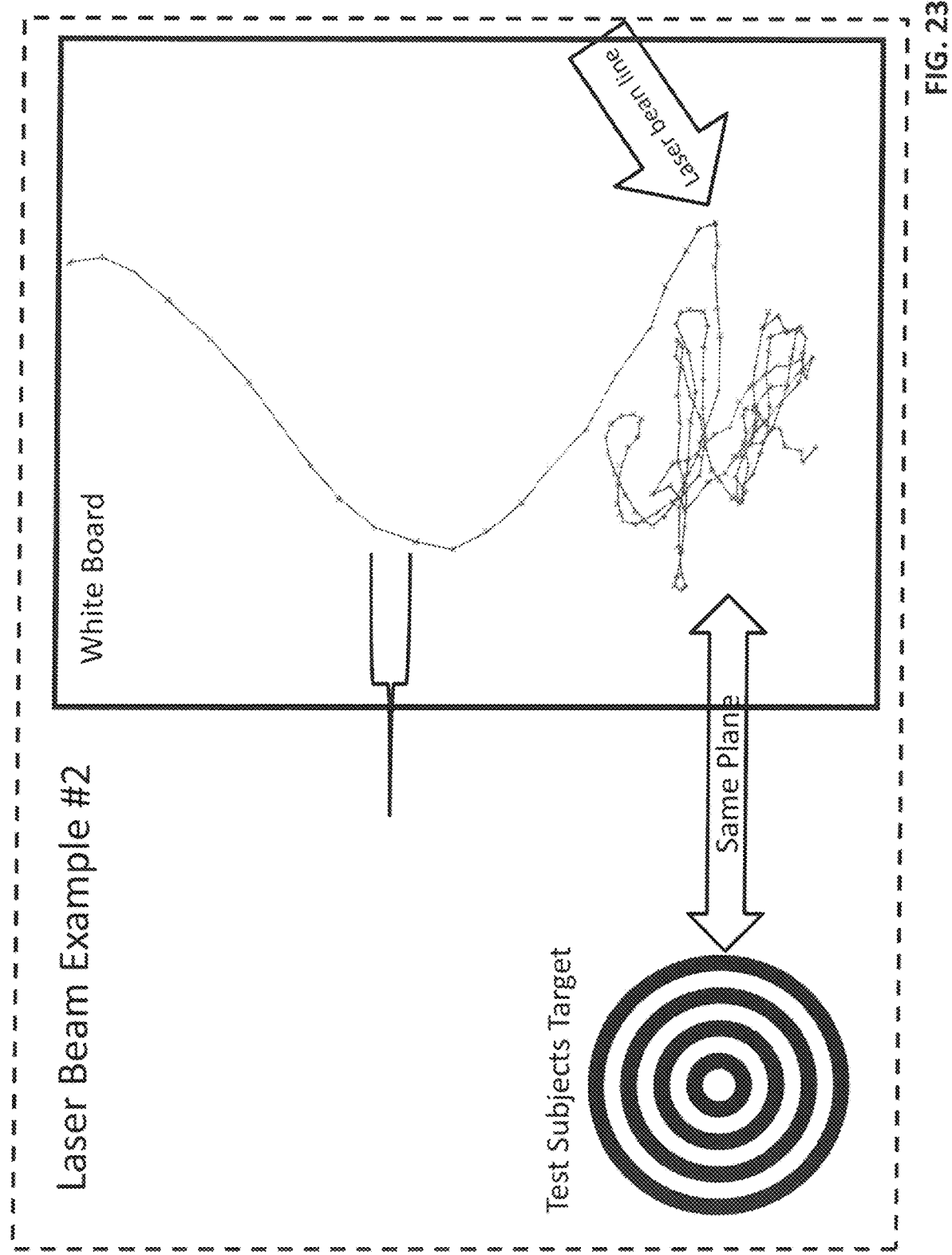
FIG. 23 is a schematic diagram illustrating a laser beam example #2.

Referring to FIG. 23, the laser beam line is displayed on the whiteboard in a second trial. Each gap between data points determines how quickly the beam moves. The closer these data points are to each other, the greater the stability of the aiming process.

Test #1 (for test results #1A and #1B) was structured and conducted as follows:

(a) Test Description:
(i) Test subject follows the set-up procedure as described above.
(ii) Test subject shoots three arrows into the same target at different times.

(b) Test Variables:
(i) Test subject shot the arrows using the subject's normal equipment with the addition of the prior art dampers 218 (variable #1) attached to the bow stabilizers.
(ii) Test subject shot the arrows using the subject's normal equipment with the addition of the energy absorbers 20 (variable #2) attached to the bow stabilizers.

(c) Test Results:
(i) The test analyzer examined the overall laser line length of each shot to determine excessive movement.
(ii) The test analyzer examined the three arrow group size in which the test subject shot during the use of each variable.

Figure 24:
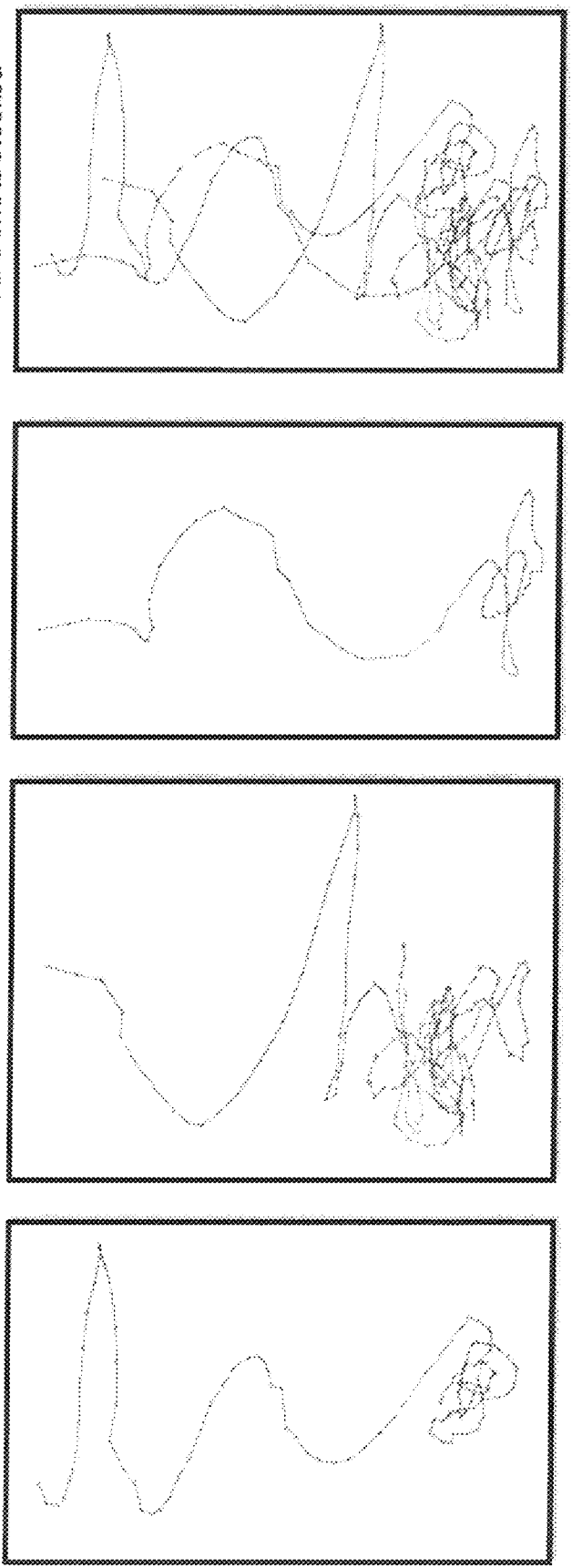
FIG. 24 is a schematic diagram illustrating the results of test #1 for variable #1.
Figure 26:
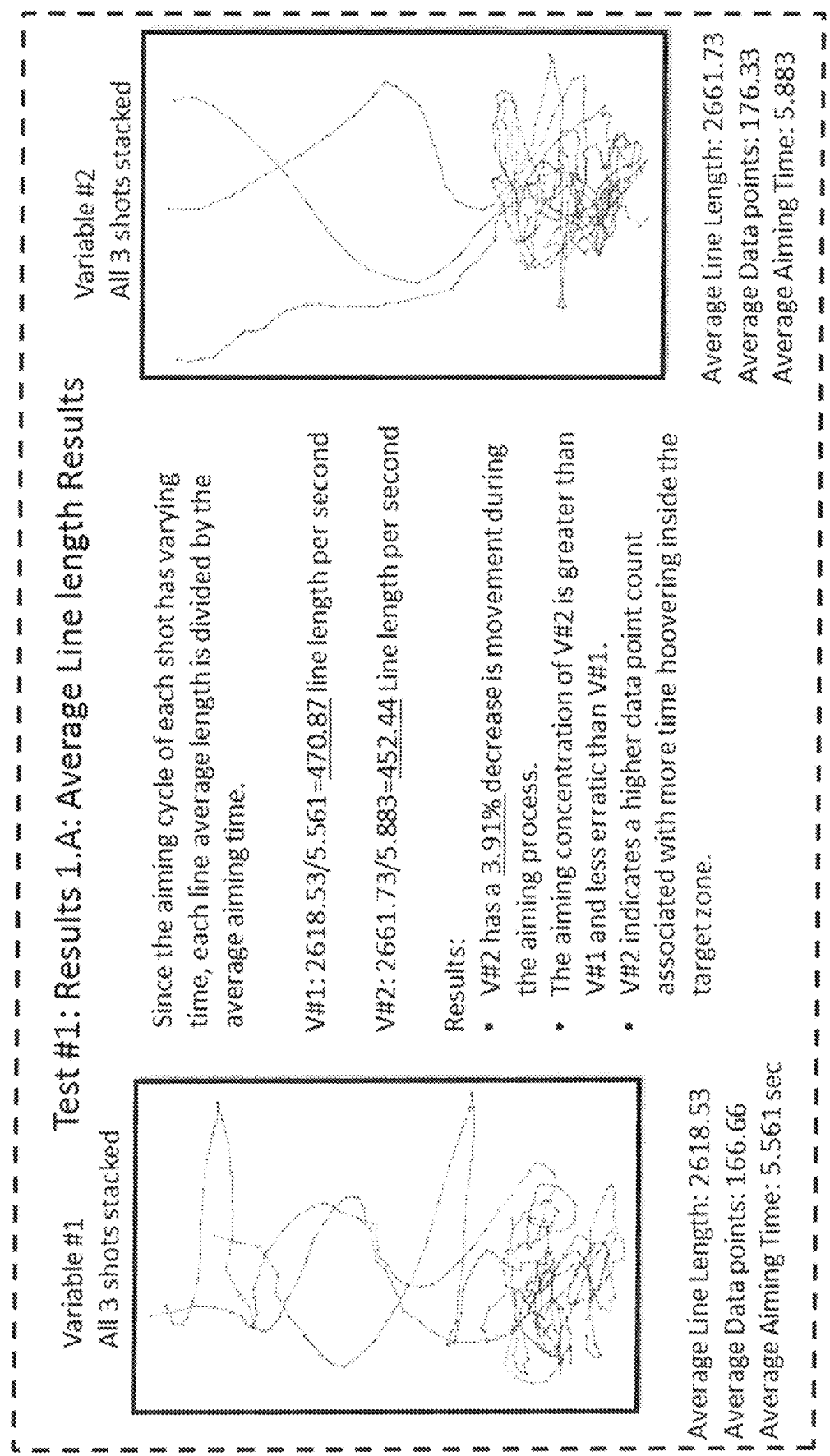
FIG. 26 is a schematic diagram illustrating a first result comparison (1.A) of variable #1 and variable #2 for test #1.

FIG. 24 illustrates and describes test #1 for the prior art dampers 218 (variable #1). FIG. 25 illustrates and describes test #1 for the energy absorbers 20 (variable #2). FIG. 26 illustrates and describes the test results #1A (based on test #1) of the prior art dampers 218 (variable #1) compared to that of the energy absorbers 20 (variable #2). As indicated in FIG. 26, energy absorbers 20 (variable #2) exhibited a 3.91% decrease in movement during the aiming process in comparison to prior art dampers 218 (variable #1). Also, the aiming concentration of energy absorbers 20 (variable #2) is greater and less erratic than the prior art dampers 218 (variable #1). Furthermore, the use of energy absorbers 20 (variable #2) indicates a higher data point count, which indicates slower, less erratic movements, resulting in a more concentrated zone of data points than prior art dampers 218 (variable #1). These results indicate a significant and substantial improvement in aiming performance due to the use of energy absorbers 20 in comparison to the use of the prior art dampers 218.

Figure 27:
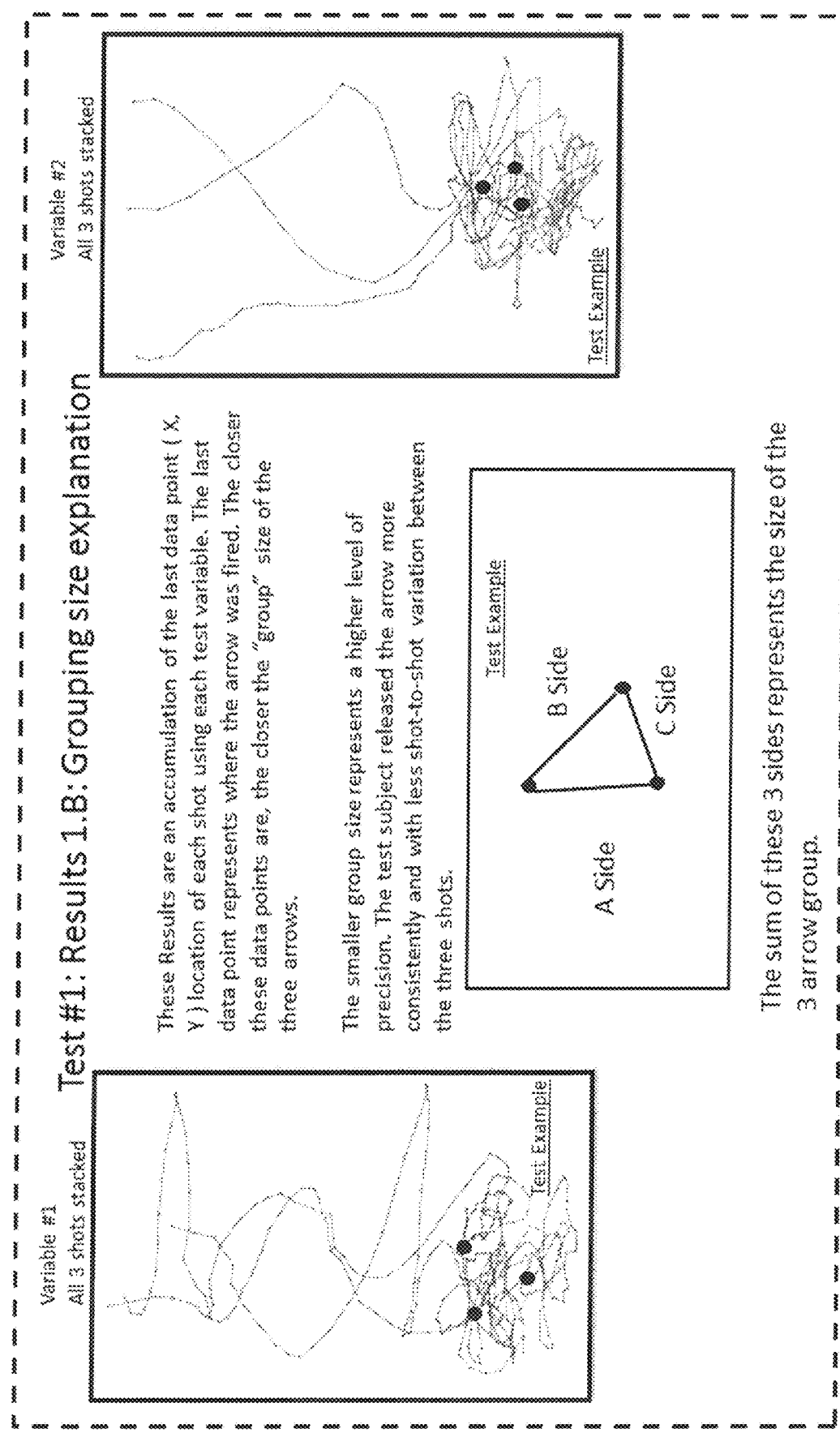
FIG. 27 is a schematic diagram illustrating a second result comparison (1.B) of variable #1 and variable #2 for test #1.

FIG. 27 illustrates and describes group size test results test #1B (based on test #1) comparing the prior art dampers 218 (variable #1) to the energy absorbers 20 (variable #2). As indicated in FIG. 27, the energy absorbers 20 (variable #2) exhibited a smaller group size, which corresponds to a higher level of precision than the prior art dampers 218 (variable #1). Using the energy absorbers 20 (variable #2), the test subject released the arrows more consistently and with less shot-to-shot variation than the prior art dampers 218 (variable #1). As indicated in FIG. 28, the energy absorbers 20 (variable #2) exhibited a 40.48% decrease in group size (corresponding to higher level of precision) compared to the prior art dampers 218 (variable #1).

Test #2 was structured and conducted as follows: each test subject was given the same, limited amount of time to aim and shoot an arrow. The test involved comparing the laser line length derived from the use of the prior art dampers 218 (variable #1) to the laser line length derived from the use of energy absorbers 20 (variable #2). As indicated in FIG. 29, test subject 1 for test #2 experienced 15.14% less movement while aiming with use of the energy absorbers 20 (variable #2) compared to the prior art dampers 218 (variable #1). As indicated in FIG. 30, test subject 2 for test #2 experienced 19.61% less movement while aiming with use of the energy absorbers 20 (variable #2) compared to the prior art dampers 218 (variable #1).

As indicated in the test results summary shown in FIG. 31, test #1A indicated a 3.91% reduction in movement, test #1B indicated a 40.48% reduction in grouping size, test #2 (subject 1) indicated a 15.14% reduction in aiming movement, and test #2 (subject 2) indicated a 19.61% reduction in aiming movement.

These results are particularly important and valuable because relatively minor deviations in aiming movements and aiming control can have a relatively high impact on the trajectory of the projectile (e.g., arrow). Also, reducing or minimizing the aiming time can be critical in shooting competitions and can be critical to shoot animals (game) that are subject to run at any given moment. Furthermore, less vibration and movement on the human body prolongs stamina and endurance to maintain higher scores for longer periods of time. Likewise, the use of the energy absorber 20 decreases the amount of work and energy the human body must contribute to aiming the shooting device, which prolongs stamina and endurance to maintain higher scores for longer periods of time. In addition, as indicated in FIG. 32, the energy absorber 20 has physical and geometric attributes that provide benefits compared to the prior art damper 218.

Additional embodiments include any one of the embodiments described above and described in any and all exhibits and other materials submitted herewith, where one or more of its components, functionalities or structures is interchanged with, replaced by or augmented by one or more of the components, functionalities or structures of a different embodiment described above. For example, in an embodiment, the bow stabilizer 28 includes or incorporates one or more of the following: energy absorbers 20, 20a, 20b, 20c, 20d, 20e, 20f and 20g, and energy absorber assembly 21. In another embodiment, the shooting equipment 22 includes or incorporates one or more of the following: energy absorbers 20, 20a, 20b, 20c, 20d, 20e, 20f and 20g, and energy absorber assembly 21. In yet another embodiment, the archer bow 24 includes or incorporates one or more of the following: energy absorbers 20, 20a, 20b, 20c, 20d, 20e, 20f and 20g, and energy absorber assembly 21. In a further embodiment, the firearm 26 includes or incorporates one or more of the following: energy absorbers 20, 20a, 20b, 20c, 20d, 20e, 20f and 20g, and energy absorber assembly 21.

The parts, components, and structural elements of each energy absorber 20, 20a, 20b, 20c, 20d, 20e, 20f, 20g, and energy absorber assembly 21 can be combined into an integral or unitary, one-piece object, or such parts, components, and structural elements can be distinct, removable items that are attachable to each other through screws, bolts, pins and other suitable fasteners.

In the foregoing description, certain components or elements may have been described as being configured to mate with each other. For example, an embodiment may be described as a first element (functioning as a male) configured to be inserted into a second element (functioning as a female). It should be appreciated that an alternate embodiment includes the first element (functioning as a female) configured to receive the second element (functioning as a male). In either such embodiment, the first and second elements are configured to mate with or otherwise interlock with each other.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

The following is claimed:

1. An energy absorber comprising:
   a shooting equipment coupler configured to be coupled to shooting equipment;
   a base configured to be coupled to the shooting equipment coupler, wherein the base comprises:
      a first base portion; and
      a second base portion
   a support comprising:
      a support surface;
      a first support portion; and
      a second support portion
   a first cord segment that couples the base to the support, wherein the first cord segment extends from the first base portion to the first support portion;
   a second cord segment that couples the base to the support, wherein the second cord segment extends from the second base portion to the second support portion; and
   an object comprising a weight, wherein the object is coupled to the support surface,
   wherein the object is configured to move relative to the base in response to vibrational energy in the shooting equipment,
   wherein the first and second cord segments are configured to maintain a distance between the support surface and the base during the movement of the object,
   wherein the first and second cord segments are configured to isolate the object from the shooting equipment,
   wherein at least one of the cord segments is configured to flex relative to the base during the movement of the object,
   wherein the flexing of the at least one cord segment causes an absorption of at least part of the vibrational energy.

2. The energy absorber of claim 1, wherein the vibrational energy is caused by a force, whether the force comprises one of: (a) at least one aiming force transmitted during an aiming period; (b) at least one shot force transmitted after the aiming period; and (c) a combination of the at least one aiming force and the at least one shot force.

3. The energy absorber of claim 2, wherein the force causes the vibrational energy to transmit in the shooting equipment.

4. The energy absorber of claim 1, wherein the shooting equipment coupler comprises a guard.

5. The energy absorber of claim 4, wherein the guard is configured to extend in a direction from the base toward the support, wherein the guard extends beyond the object to at least partially guard the object from contact with other objects.

6. The energy absorber of claim 1, wherein the shooting equipment coupler comprises an insert that is configured to be inserted into an opening defined by a portion of the shooting equipment.

7. The energy absorber of claim 1, wherein the shooting equipment coupler defines an opening configured to receive a portion of the shooting equipment.

8. The energy absorber of claim 1, wherein:
   the first cord segment comprises: (a) a first proximal cord portion that extends at least partially into the first base portion, wherein the first proximal cord portion extends in a first base direction; and (b) a first distal cord portion that extends at least partially into the first support portion, wherein the first distal cord portion extends in a first support direction, wherein the first base direction is oriented at a first angle relative to the first support direction; and
   the second cord segment comprises: (a) a second proximal cord portion that extends at least partially into the second base portion, wherein the second proximal cord portion extends in a second base direction; and (b) a second distal cord portion that extends at least partially into the second support portion, wherein the second distal cord portion extends in a second support direction, wherein the second base direction is oriented at a second angle relative to the second support direction.

9. The energy absorber of claim 1, wherein each of the first and second cord segments comprises a suspension characteristic and an absorption characteristic.

10. The energy absorber of claim 1, wherein the base, the support and the first and second cord segments are configured so that the first and second cord segments are: (a)

deformable from an initial shape to a deformed shape in response to the force at a point in time; and (b) predisposed to return to the initial shape after the point in time.

11. The energy absorber of claim 1, wherein the object comprises a mass associated with a designated weight.

12. The energy absorber of claim 1, wherein the object comprises a plurality of weight components, wherein: (a) each of the weight components comprises a designated weight; and (b) each of the weight components is configured to be detached from the object.

13. The energy absorber of claim 2, wherein:
the base, the support and the first and second cord segments are configured so that: (a) the first and second cord segments comprise an initial shape before the aiming force is transmitted to the shooting equipment; (b) the first and second cord segments comprise an aim response shape after the aiming force is transmitted to the shooting equipment; and (c) the first and second cord segments comprise a shot response shape after the shot force is transmitted to the shooting equipment; and
the initial shape, the aim response shape, and the shot response shape differ from each other.

14. The energy absorber of claim 1, wherein the base, the support, the first and second cord segments, and the object are configured so that the object is moveable in a plurality of different oscillation motions, wherein the oscillation motions comprise at least an inward-outward oscillation, an upward-downward oscillation, and a forward-rearward oscillation.

15. An energy absorber comprising:
a shooting equipment coupler configured to be coupled to shooting equipment;
a base configured to be coupled to the shooting equipment coupler;
a support;
a plurality of cord segments that couple the base to the support, wherein the cord segments extend from the base to the support; and
an object coupled to the support,
wherein the plurality of cord segments are configured to isolate the object from the shooting equipment;
wherein the base, the support and the cord segments are configured so that the cord segments:
comprise an initial shape before an aiming force is received by the shooting equipment;
change to an aim response shape after the shooting equipment receives the aiming force; and
change to a shot response shape after at least part of the shooting equipment receives a shot force.

16. The energy absorber of claim 15, wherein:
the initial shape, the aim response shape, and the shot response shape differ from each other; and
the shooting equipment comprises one of: (a) an archery bow; (b) a compound bow; (c) a crossbow; (d) a recurve bow; (e) a spring-based, projectile launcher; (f) a firearm; (g) a long range rifle; (h) a fully or partially automatic rifle; (i) a handgun; and (j) an ammunition-based weapon.

17. The energy absorber of claim 15, wherein:
the shooting equipment coupler comprises a guard;
the guard is configured to extend in a direction from the base toward the support, wherein the guard extends beyond the object to at least partially guard the object from contact with other objects.

18. The energy absorber of claim 15, wherein:
each of the cord segments comprises a suspension characteristic and an absorption characteristic; and
the base, the support, the cord segments, and the object are configured so that the object is moveable in a plurality of different oscillation motions, wherein the oscillation motions comprise at least an inward-outward oscillation, an upward-downward oscillation, and a forward-rearward oscillation.

19. A method for manufacturing an energy absorber, wherein the method comprises:
accessing a shooting equipment coupler that is configured to be coupled to a portion of shooting equipment;
coupling a base to the shooting equipment coupler;
accessing a support;
coupling a plurality of cord segments to the base and the support so that the cord segments extend from the base to the support;
coupling an object to the support, wherein the plurality of cord segments are configured to isolate the object from the portion of shooting equipment; and
configuring the base, the support and the cord segments so that the cord segments:
comprise an initial shape before an aiming force is received by the shooting equipment;
change to an aim response shape after the shooting equipment receives the aiming force; and
change to a shot response shape after at least part of the shooting equipment receives a shot force.

20. The method of claim 19, comprising:
configuring the base, the support and the cord segments so that:
the initial shape, the aim response shape, and the shot response shape differ from each other; and
the object is moveable in a plurality of different oscillation motions, wherein the oscillation motions comprise at least an inward-outward oscillation, an upward-downward oscillation, and a forward-rearward oscillation; and
configuring each of the cord segments to comprise a suspension characteristic and an absorption characteristic.

* * * * *